United States Patent [19]

Kucera

[11] Patent Number: 4,724,523
[45] Date of Patent: Feb. 9, 1988

[54] METHOD AND APPARATUS FOR THE ELECTRONIC STORAGE AND RETRIEVAL OF EXPRESSIONS AND LINGUISTIC INFORMATION

[75] Inventor: Henry Kucera, Providence, R.I.

[73] Assignee: Houghton Mifflin Company, Boston, Mass.

[21] Appl. No.: 750,911

[22] Filed: Jul. 1, 1985

[51] Int. Cl.⁴ .............................................. G06F 15/38
[52] U.S. Cl. .................................... 364/419; 364/900
[58] Field of Search ............... 364/419, 200 MS File, 364/900 MS File

[56] References Cited

U.S. PATENT DOCUMENTS

| | | | |
|---|---|---|---|
| 4,384,329 | 5/1983 | Rosenbaum et al. | 364/300 |
| 4,412,305 | 10/1983 | Yoshida | 364/900 |
| 4,417,319 | 11/1983 | Morimoto et al. | 364/900 |
| 4,420,816 | 12/1983 | Yoshida | 364/900 |
| 4,420,817 | 12/1983 | Yoshida | 364/900 |
| 4,439,836 | 3/1984 | Yoshida | 364/419 X |
| 4,502,128 | 2/1985 | Okajima et al. | 364/419 X |
| 4,542,477 | 9/1985 | Noyori et al. | 364/900 |
| 4,542,478 | 9/1985 | Hashimoto et al. | 364/900 |
| 4,586,160 | 4/1986 | Amano et al. | 364/419 X |
| 4,590,560 | 5/1986 | Sado | 364/419 |
| 4,594,686 | 6/1986 | Yoshida | 364/419 X |
| 4,633,435 | 12/1986 | Morimoto et al. | 364/419 X |
| 4,654,798 | 3/1987 | Taki et al. | 364/419 |

Primary Examiner—Jerry Smith
Assistant Examiner—Clark A. Jablon
Attorney, Agent, or Firm—Lahive & Cockfield

[57] ABSTRACT

The invention relates to a system for storing, retrieving, and processing linguistic information. In one aspect, the invention provides a system for storing linguistic expressions, which system includes a main dictionary storage section and three coding sections, one for each of regular paradigm information, partially irregular paradigm information, and fully irregular paradigm information. In another aspect, the invention provides a system for evaluating linguistic expressions, e.g., words, and determining their grammatical and inflectional information. The invention has applicability in the field of word processing.

76 Claims, 8 Drawing Figures

METHOD AND APPARATUS FOR THE ELECTRONIC STORAGE AND RETRIEVAL OF EXPRESSIONS AND LINGUISTIC INFORMATION

BACKGROUND

This invention relates to a system for the electronic storage and retrieval of expressions and linguistic information. More particularly, it pertains to a method and apparatus for the storage of digital signals representative of linguistic expressions, e.g., words, based upon the grammatical and inflectional characteristics of the expressions. The invention also pertains to a method and apparatus for determining the grammatical type and inflection aspects of an input expression. The invention also pertains to a method and apparatus for the electronic generation of expressions linguistically related, both grammatically and inflectionally, to an input expression. The invention has application in the field of text processing, for example, in a word processor.

In general, text processing systems facilitate the preparation of printed documents. Early text processing systems provided simple text formatting features, e.g., text justification, automatic hyphenation, and tabulation. Subsequent systems provided spelling verification procedures to flag incorrectly spelled words. More recently, these systems have incorporated automatic word correction facilities.

A recent advance in text processing systems is the inclusion of a so-called "electronic thesaurus," i.e., a system for generating a list of words linguistically related, i.e., synonymous or antonymous, to a designated word. One such system is described by Rosenbaum et al, U.S. Pat. No. 4,384,329. That system incorporates an ordered vocabulary of linguistic expressions and an NxN binary matrix defining the relationship between expressions in the vocabulary. An input expression is compared with successive entries of the vocabulary to find a match. Access to the corresponding entry of the matrix provides the address of synonymous and antonymous expressions. In part, the utility of the Rosenbaum et al system is constrained by the method with which vocabulary expressions are stored: each expression is stored in its entirety. Further, the system does not provide grammatical and inflectional information for the entries. Consequently, the system is not understood to recognize, for example, the word "came" to be the past tense inflectional form of the verb "to come". Another drawback of the system is that expressions identified as being synonymous and antonymous with the input expression are generated without regard to the grammatical or the inflectional classification of that input expression.

An object of this invention, accordingly, is to provide an improved system for the storage and retrieval of expressions and linguistic information for use in automated text processing equipment.

Another object of the invention is to provide a method and apparatus for the space-efficient storage of digital signals representative of expressions and linguistic information.

A further object of the invention is to provide a system for the rapid electronic determination of the grammatical and the inflectional classification of an input expression.

Still further, an object of the invention is to provide an improved electronic thesaurus, which is capable of producing a list of expressions both grammatically and inflectionally related to an input expression, i.e., being directly substitutable for the input expression without requiring user intervention for inflecting those related expressions.

Other objects of the invention are evident in the following description.

GENERAL DESCRIPTION

The invention attains the aforementioned objects and is based, in part, upon the storage and retrieval of linguistic expressions in a manner which utilizes the linguistic characteristics of the expressions. One such linguistic characteristic, the grammatical classification, relates to the syntactic function of an expression. The nominal classification, for example, pertains to words that designate objects, states, or qualities, e.g., the nouns "dog", "extreme", and "overabundance". The verbal grammatical class, on the other hand, relates to words that express action or state of being, e.g., "to run" and "running". Two other classifications, adjectives and adverbs, relate to words which modify nouns and verbs, respectively, e.g., "blue" and "quickly".

Another linguistic characteristic utilized in the invention is word inflection, i.e., a word form which relates to specific grammatical or syntactic function. The inflectional forms of the verb "to consider", for example, vary according to its specific usage within a sentence. In the infinitive, the verb is not inflected, i.e., it is in its base form, e.g., as in "to consider the option." In its third person singular form, however, the verb includes the suffix "s", as in "she considers the option." Still further, in its present participle form, the verb includes the suffix "ing", as in "he is considering the option," while in its past tense and past participle forms, the verb includes the suffix "ed," as in "they considered the option" and "they have considered the option."

Generally, English verbs occur in five inflectional forms: the infinitive; the present tense, third person singular; the past tense; the past participle; and, the present participle. As noted above, for the verb "to consider", these forms are "consider, considers, considered, considered, considering." In a somewhat more complex case, the stem-final consonant of a verb is doubled prior to adding the suffix, as for the verb "to transfer", in which the inflectional forms are "transfer, transfers, transferred, transferred, transferring". Together, the inflectional forms of a verb comprise a verbal paradigm.

English language nouns also take on varied forms depending upon their syntactic usage. In the singular, the noun "dog" is uninflected, as in "he is a good dog," while the plural noun includes the suffix "s", as in "they are good dogs." In a somewhat more complex case, the penultimate letter of a noun is removed or altered prior to adding a suffix. For example, the plural form of the noun "try"(meaning "a deliberate effort") includes the suffix "ies" in place of the final "y", as in "it ran after several tries". As English nouns occur in four inflectional forms, i.e., singular, singular-possessive, plural, and plural-possessive, the nominal paradigm for "dog" is "dog, dog's, dogs nominal paradigm for "try" is "try, try's, tries, tries'".

Still another fundamental classification upon which the invention is based relates to paradigm classifications. A majority of English nominal and verbal paradigms include exclusively elements which are formed by the addition of a suffix to a base form. Sometimes, as noted above, prior to the appending of the suffix, the terminal letter of the verb is altered, e.g., doubled, dropped, or replaced. The inflectional forms of the verbs "to consider" and "to transfer" and the nouns "dog" and "try", listed above, form two such exemplary paradigms. Paradigms of this type are deemed "regular" paradigms.

A second class of paradigms, include, in addition to elements formed by appending a suffix to a base form, one or two exceptional inflected forms which are not amenable to broad categorization. The verb "to give", for example, has three regular paradigm elements, i.e., the uninflected base form "give", the present tense, third person singular form "gives", and the present participle form "giving". The paradigm also includes two exceptional elements, i.e., the past tense form "gave", and the past participle form "given". Another word having a partially irregular paradigm is, the noun "ox", which has an exceptional irregular form "oxen". Paradigms of this type are deemed partially irregular paradigms.

A third class of paradigms is associated with those relatively few words which have inflectional forms which do not fall within the above classifications. These words are characterized as (1) having verbal paradigms for which an exceptional inflected element is neither a past participle form or a past tense form; or (2) having a partially irregular paradigm for which an inflected element is either (a) equivalent to the base form of another irregular paradigm (e.g., "saw" is the past tense of the irregular verb "to see", and is also a base form verb (meaning: "to cut") having the irregular past participle "sawn"), or (b) equivalent to an inflected form of any other paradigm (e.g., "lives" is the irregular plural of the noun "life", and the regular third person singular form of the verb "to live"). Exemplary fully irregular paradigms in this class are associated with the verb "to be" ("be", "am", "is", "are", "was", "were", "been", "being"); and, with the noun-verb "saw" ("saw", "saw's", "saws", "saws'", "sawed", "sawn", "sawing").

One aspect of this invention provides an apparatus for the electronic storage of expressions and linguistic information, and wherein the apparatus is based, in part, upon those fundamental characteristics of the English language discussed above. The apparatus includes a main dictionary element, for storing entries representative of linguistic expressions, and has a coding element, for storing linguistic information corresponding to these expressions. The entries of the main dictionary represent at least one of a base form of a regular paradigm, a base form of a partially irregular paradigm, an exceptional inflected form of a partially irregular paradigm, and an element of a fully irregular paradigm. The coding element includes three sections: a first coding section stores a first linguistic information pattern corresponding to at least one stored regular paradigm base form-representative entry. A second coding element stores a second linguistic information pattern corresponding to at least one stored partially irregular paradigm element-representative entry. A third coding section stores a third linguistic information pattern corresponding to at least one said stored fully irregular paradigm element-representative entry.

According to other aspects of the invention, the first coding section can store signals representative of regular paradigms, including words having simple inflectional forms, e.g., the verb "to consider" and the noun "dog", as well as those having somewhat more complex forms, e.g., the verb "to transfer" and the noun "try". The second coding section can include both an element for storing signals representative of partial paradigms, and an element for storing signals relating to exceptional inflected forms of each of these partial paradigms. The third coding section can include signals representative of other elements of a fully irregular paradigm to which the stored entry is associated.

In other aspects of the invention, the main dictionary element is divided into sections for storing entries representative of varied character-length expressions. The main dictionary can also include an element for representing linguistic interrelationships, e.g., synonymy or antonymy, between entries of the main dictionary. This element can also include an element for representing the definitional aspects of each main dictionary base form expression.

The invention also provides an apparatus for processing signals representative of linguistic expressions, which apparatus comprises an element for accepting a signal representative of an input expression; an element for determining a grammatical and an inflectional classification of the input expression, and an element for outputting the classification-representative signal.

According to another aspect, the processing apparatus can include an element for generating a signal representative of expressions linguistically related, e.g., synonymous or antonymous, to an input expression. This related-expression signal can represent an expression of like grammatical and inflectional classification as the input expression. The apparatus can also include elements for determining the base form and the suffix of the input expression. These elements may, in turn, include a main dictionary and coding elements similar to those described above.

Still further aspects of the invention provide elements responsive both to the grammatical and inflectional classifications of the input expression, as well as the grammatical and inflectional aspects of a related expression, for generating a signal representative of an expression having an inflected form matching that of the input expression.

Still further aspects of the invention provide methods for storing expressions and linguistic information in an apparatus of the type discussed above. The invention also contemplates methods for operating a linguistic expression processing apparatus of the type described above.

The aforementioned and other aspects of the invention are evident in the description which follows.

BRIEF DESCRIPTION OF THE ILLUSTRATIONS

A more complete understanding of the invention may be attained by reference to the following description and the accompanying drawings, in which.

DESCRIPTION OF THE ILLUSTRATED EMBODIMENT

Figure 1:
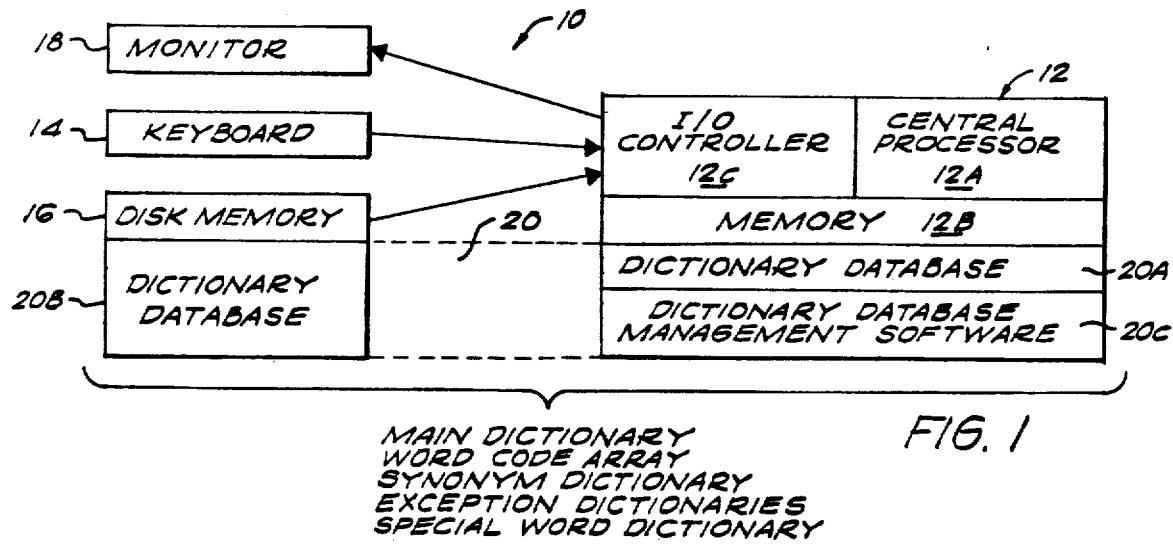
FIG. 1 is a block schematic representation of a text processing system embodying a practice of the invention.

A text processing system for practicing the invention typically has a configuration as shown in FIG. 1. The illustrated system 10 has a programmed digital computer 12 which includes the central processing unit 12A connected with memory units 12B and with an input/output control unit 12C. The computer 12 can be one of numerous commercially programmable digital computers.

The computer 12 is connected with a high speed non-volatile storage device, i.e., disk memory 16. Computer 12 also connects with a monitor or display terminal 18 and with a keyboard 14. The terminal and keyboard provide an interface between the text processing system user and the computer. Specifically, the keyboard translates user-typed commands into computer readable signals, while display terminal 18 displays in human readable form signals output from the computer.

The illustrated system 10 employs portions of various memory elements to store a linguistic database 20, indicated with dashed lines. In particular, database portion 20A resides in the computer memory unit 12B, and a database portion 20B resides in the disk memory 16. Further, database management software 20C resides in the computer memory unit 12B.

The database management software controls the accessing and decoding of information stored in database portions 20A and 20B. This software permits retrieval of database entries in logical form, e.g., linguistic expressions. It thereby eliminates the requirement that the physical layout and the physical form of the data be defined within the application software, e.g., the electronic thesaurus.

Information stored in the database 20 includes linguistic expressions, inflectional and grammatical information, definitional information, and synonymy information, and is allocated among several dictionaries. These include a main dictionary, a word code array, a synonym dictionary, an exception dictionaries, and a special word dictionary.

Briefly, the main dictionary stores linguistic expressions and includes base forms, exceptional or irregular inflectional forms, and uninflectable expressions, e.g., adjectives and adverbs. The word code array stores regular paradigm information and addressing information for the partially and fully irregular paradigms. The exceptional dictionaries store information pertaining to partially irregular paradigms, while the special word dictionary stores information relating to fully irregular paradigms. The synonym dictionary stores information pertaining to the definition of each main dictionary base form expression and the linguistic interrelationship, e.g., synonymy, of these expressions.

Figure 2:
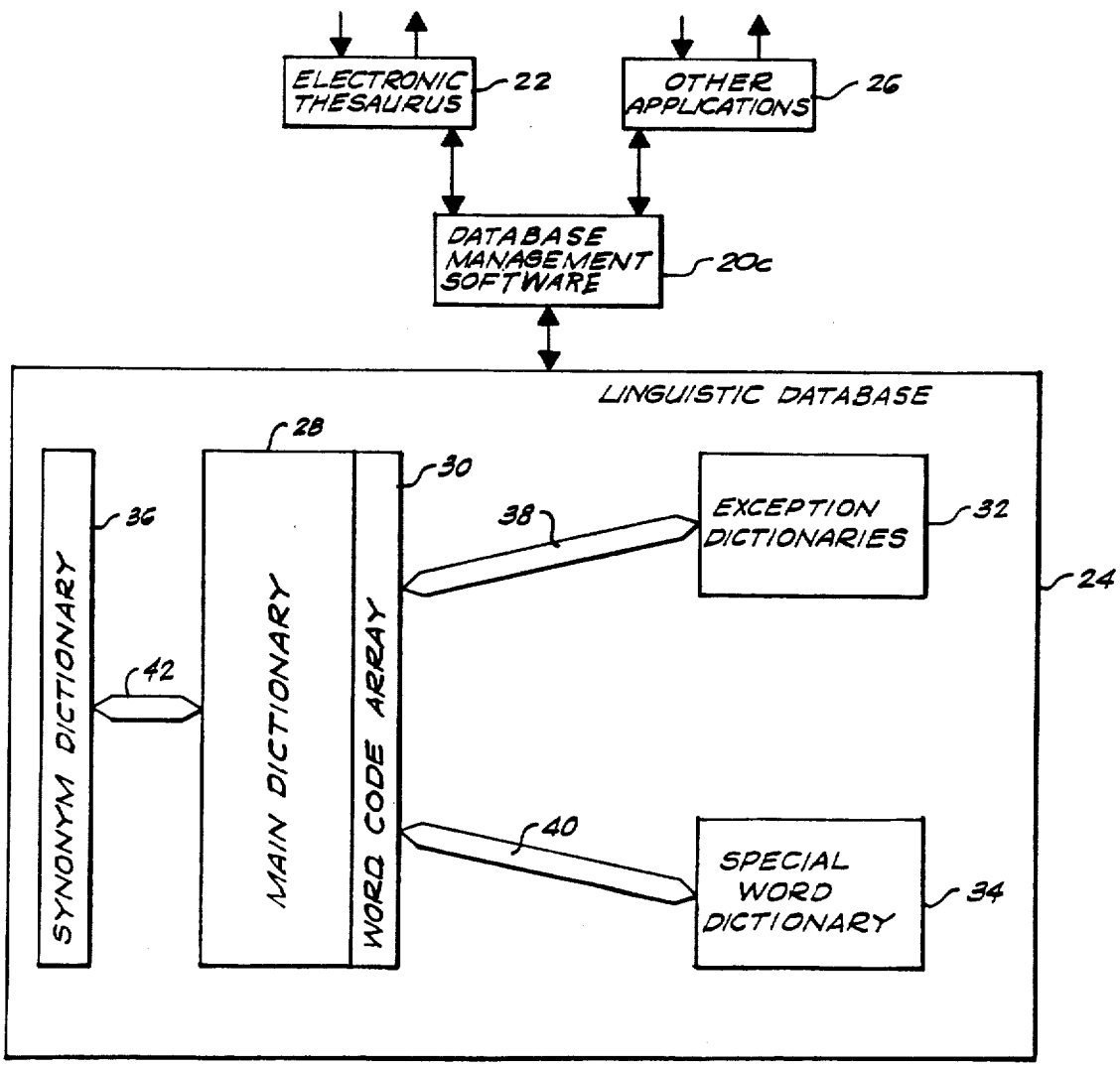
FIG. 2 is a block schematic representation of one practice of the invention, depicting the interrelationship of the applications software, including an electronic thesaurus, and a linguistic expression storage apparatus.

FIG. 2 presents a more detailed view of the interaction between user application software (resident in central processor 12A of FIG. 1) and the database dictionaries (element 20 of FIG. 1). Referring to FIG. 2, electronic thesaurus software 22 interfaces the linguistic database 24 (corresponding to elements 20A and 20B of FIG. 1) by way of the database management software 20c. Other application software 26, e.g., grammer verification software and speech processing software, accesses the database in a similar fashion. The illustrated linguistic database 24 includes a main dictionary 28, a word code array 30, the exception dictionaries 32, a special word dictionary 34, and a synonym dictionary 36. As indicated by lines 38, 40, 42, the database elements include a pointer structure, i.e., cross-reference addressing information, connecting the corresponding elements of each structure.

In a preferred embodiment, the main dictionary 28 stores linguistic expressions, including adverbs, adjectives, nouns, and verbs. The nominal and verbal expressions include regular paradigm base form expressions, partially irregular paradigm base form expression, exceptional inflected form expressions, and fully irregular paradigm expressions. By way of example, the main dictionary 28 may include the adverbs "quickly", "slowly", etc.; the adjectives "red", "blue", "short", etc.; the regular paradigm base form expressions "consider", "transfer", "dog", "try", etc.; partially irregular paradigm base form expressions and exceptional inflected form expressions, e.g., "give", "gave", "given"; and, the inflected forms of a fully irregular paradigms, e.g., "have", "had", "has", "having".

In a preferred embodiment, the main dictionary 28 is arranged functionally into four sections. The first section stores words having a character length of eight or less; the second section contains words having a character length between nine and sixteen, inclusive; the third section contains words having a character length greater than sixteen; and the fourth section contains words beginning with a capitalized letter, e.g., proper nouns. For sake of clarity, the four-way character length division of the main dictionary 28 is not indicated in the illustration.

The words stored in the aforementioned first two dictionary 28 sections may be bit-wise compressed, e.g., from their standard 8-bit EBCDIC representation to a 5-bit code. According to a preferred compression technique, a character-by-character translation transforms the character "" (blank) to the binary value zero, the character "-" (hyphen) to the binary value one, the character "'" (apostrophe) to the binary value two, and the characters "a" through "z" to the binary values 3 through 28, respectively. Following this numeric transformation, the resultant values are packed into a 40-bit string, for expressions stored in the first dictionary section, and into an 80-bit string for expressions stored in the second dictionary section. During operation of the applications programs 22 and 26, the database management software 20C decompresses these entries to produce expressions in standard digital signal form.

A word code array 30, also shown in FIG. 2, contains entries corresponding with each of the expressions in the main dictionary 28. These word code array entries serve one of two functions. For those expressions in the main dictionary 28 which are elements of either a partially irregular paradigm or a fully irregular paradigm, the corresponding word code array entry retains an address of a corresponding entry in either the exception dictionaries 32 or the special word dictionary 34. For other main dictionary expressions, i.e., adverbs, adjectives, and regular paradigm base forms, the word code array stores grammatical and inflectional information.

In a preferred embodiment, the dual functionality of the word code array entries is provided by a 12-bit code. The setting of the first two bits of the code determines the content of the remaining ten bits. More particularly, if the first two bits are not set, than the remaining bits reflect grammatical and inflectional information for adjectives, adverbs, or regular paradigm base form expressions. On the other hand, if either of the first two bits are set, the remaining ten bits reflect addressing information.

More fully, the interrelationship and meaning of the bits of each word code array entry are detailed below for one preferred illustrative embodiment.

TABLE I

| Bit: | Interpretation: |
|---|---|
| 1 | If set, then use Interpretation B (word is in the exception dictionaries); otherwise, check Bit 2. |
| 2 | If set, then use Interpretation B (word is in the Special Word Dictionary; otherwise use Interpretation A. |
| | Interpretation A: |
| 3 | If set, then word is an (uninflectable) adjective. |
| 4 | If set, then word is an inflectable noun. |
| 5 | If set, then word is an (uninflectable) adverb. |
| 6 | If set, then word is an (inflectable) verb. |
| 7-8 | Disregard if Bit 6 is not set; contains the uninflectable noun flag and the verb inflected form stem doubling codes as follows: '00'B = no doubling; '01'B = noun in uninflectable; '10'B = doubling in the past tense and past participle only; '11' = doubling in the past tense, past participle, and present participle |
| 9-10 | Disregard if Bit 4 is not set; contains the noun inflection codes as follows: '00'B = regular noun inflection with the suffix complex [0, 's, s, s']; '01'B = regular noun inflection of word-final sibilants, with the suffix complex [0, 's, es, es']; '10'B = regular noun inflection of word-final "y" preceded by "u" or a consonant, with the suffix complex [y, y's, ies, ies']; '11'B = regular noun inflection with equivalent singular and plural roots with the suffix complex [0, 's, 0, 's]. |
| 11-12 | Disregard if Bit 6 is not set; otherwise, the bits contain the verb inflection codes as follows: '00'B = regular verb inflection with the suffix complex [0, s, ed, ed, ing]; '01'B = regular verb inflection of word-final sibilants, with the suffix complex [0, es, ed, ed, ing]; '10'B = regular verb inflection of word-final "y" preceded by "u" or a consonant, with the suffix complex [y, ies, ied, ied, ying]; '11'B = regular verb inflection with the past tense and past participle forms equivalent to the infinitive, with the suffix complex [0, s, 0, 0, ing]. |
| | Interpretation B: |
| 1 | If set, then if Bit 2 is also set, then the address in Bits 4 through 12 references the inflected form exception dictionary; otherwise it references the base form exception dictionary. |
| 2 | If set (and Bit 1 is not set), then the address in Bits 4 through 12 references the special words' dictionary. |
| 4-12 | Nine-bit address (512 possible values). |

In Table I, the bracketed entries represent paradigm element suffixes. For example, according to Interpretation A, Bits 9-10, nominal class 1, associated with the digital code '00'B, has a suffix complex [0, 's, s, s']. This complex indicates that the singular form of the noun does not require a suffix; the singular possessive form of the noun requires a suffix "'s"; the plural form of the noun require the suffix "s"; and, the plural possessive of the noun requires the suffix "s'". In a like manner, Table I lists the suffix complex pattern for nominal class 2, associated with the digital code '01'B; for nominal class 3, associated with the digital code '10'B; and, for nominal class 4, associated with the digital code '11'B.

With further reference to Table I, Interpretation A, Bits 11-12 indicate the suffix complexes for regular verbal classes. In particular, verbal class 1, associated with the digital code '00'B, corresponds to the complex [0, s, ed, ed, ing]. This complex indicates that the infinitive form is not inflected; the third person singular form includes the suffix "s"; that the past tense and past participle forms include the suffix "ed"; and, that the present participle form "ing". The table similarly lists the suffix complexes for verbal class 2, associated with the digital code '01'B; for verbal class 3, associated with the digital code '10'B; and, for verbal class 4, associated with the digital code '11'B.

According to Interpretation B, Bits 4-12 address an entry of either of the exception dictionaries 32 or the special word dictionary 34. The addressed entries in these dictionaries contain grammatical and inflectional information regarding the expression.

Figure 3:
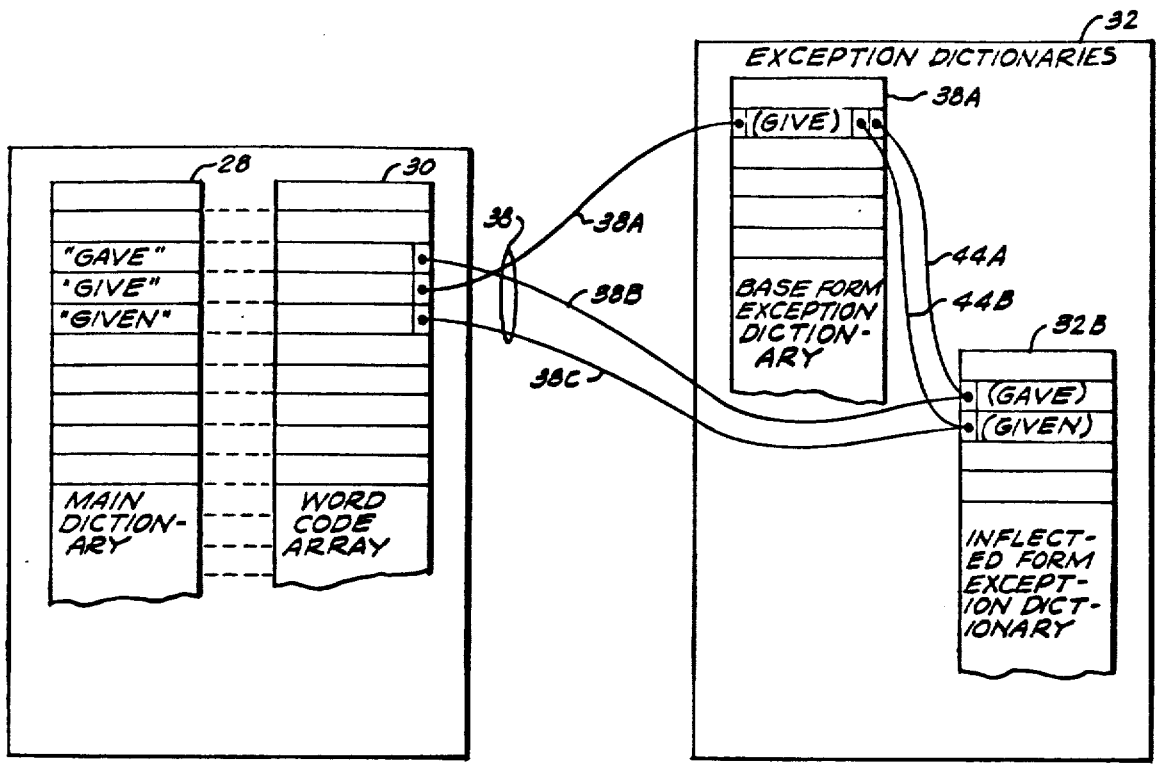
FIG. 3 is a block schematic representation of one practice of the invention, depicting the interrelationship of the main dictionary and the exception dictionaries.

FIG. 3 depicts the interrelationship between the main dictionary 28 and the exception dictionaries 32. In general, each partially irregular paradigm expression stored in the main dictionary 28 corresponds to an entry stored in one of two sections of the exception dictionaries 32. More particularly, each partially irregular paradigm base form representative entry of the main dictionary corresponds to an entry in the base form exception dictionary 32A, while each partially irregular exceptional inflected form represented entry of the main dictionary corresponds to an entry within the inflected form dictionary 32B. The correspondence of these entries is provided by a pointer structure 38, which includes cross-reference addresses within each of the exception dictionaries 32A, 32B and within the word code array 30.

With regard to informational content, the entries of the base form exception dictionary 32A primarily provide grammatical and inflectional information for the regularly inflected forms of each partially irregular paradigm. The entries of the inflected form exception dictionary 32B, on the other hand, store grammatical and inflectional information regarding the exceptional inflected forms of the partially irregular paradigms.

Referring to FIG. 3, the partially irregular paradigm of the word "give" corresponds with entries of both sections of the exception dictionaries 32. By way of pointer structure element 38A, the illustrated base form element "give" is associated with an element in the base form exception dictionary 32A. By way of pointer elements 38B and 38C, the exceptional inflected forms "gave" and "given" are associated with corresponding entries in the inflected form exception dictionary 32B. The pointer elements 38 represent cross-reference addressing within the word code array and each of the exception dictionaries 32A, 32B. That is, for example, an address stored in the word code array entry corresponding with the expression "give" addresses a base form exception dictionary entry. In turn, this entry includes an address of the expression "give" within the main dictionary.

Pointer elements 44A, 44B provide a connection between the partially irregular paradigm entries within the exception dictionaries. The first pointer 44A inter-connects the base form exception dictionary entry with the corresponding entry of the inflected form exception dictionary 32B. Similarly, the pointer 44B ties the base form entry with the corresponding inflected form entry. As above, this interconnection represents cross-reference addressing within the entries of each of the exception dictionaries portions 32A, 32B.

In addition to addressing information, the entries of the base form exception dictionary 32A store grammatical and inflectional information for each partially irregular paradigm base form expression. More particularly, each entry within the dictionary 32A has content as described below, for the same embodiment of Table I.

TABLE II the address within the main dictionary of the base form expression;

the address within the inflected form dictionary 32B of a first, or only, exceptional inflected form of the partially irregular paradigm;

the address within the inflected from dictionary 32B of a second exceptional inflected form of the partially irregular paradigm;

a 1-bit flag that is set if the partially irregular paradigm is nominal; the bit flag is not set if the partially irregular is verbal;

a 2-bit code that indicates the inflectional class of the partial verbal paradigm corresponding to the third person singular form and present participle form of the exceptional inflected form, according to the following code: '00'B=partial paradigm is inflected according to verbal class 1; '10'B=partial paradigm is inflected according to verbal class 1 with doubling of the stem-final consonant in the present participle; and, '11'B=partial paradigm is inflected according to verbal class 2; and, a 5-bit code that has each element set if the following is true of the base form of the partially irregular paradigm: (1) it is also inflected regularly according to the suffix complex of nominal class 1; (2) it is also inflected regularly according to the suffix complex of nominal class 2; (3) it is also an adjective; (4) it is also a verbal past tense; and, (5) it is also a verbal past participle.

The entries of the inflected form exception dictionary retain, in addition to addressing information, grammatical and inflectional information relating to a particular exceptional inflected form of the partially irregular paradigm. More particularly, the contents of each entry of the dictionary 32B is provided in the Table III below, for the embodiment of Table I.

TABLE III the address within the main dictionary of the exceptional inflected form;

the address within the base form exception dictionary 32A of the base form of the partially irregular paradigm;

a 2-bit code pertaining to the exceptional inflected form inflectional type, as follows: '00'B=plural noun; '01'B=past tense verb; '10'B=past participle; and '11'B=past tense and past participle; and, a 3-bit code that has each element set if the following is true of the exceptional inflected form: (1) it is also inflected regularly according to the suffix complex of nominal class 1; (2) it is also an adjective; and, (3) it is also inflected regularly according to the suffix complex of verbal class 1.

Figure 4:
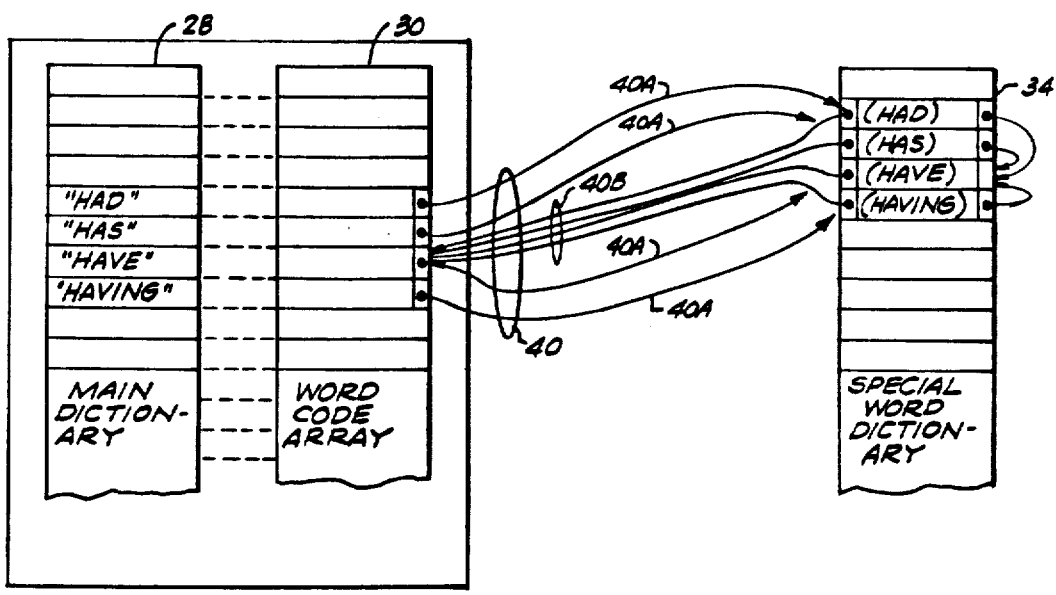
FIG. 4 is a block schematic representation of one practice of the invention illustrating the interrelationship of the main dictionary and the special word dictionary.

FIG. 4 depicts the interrelationship of the main dictionary 28 and the special word dictionary 34. Each entry of the main dictionary which is an element of a fully irregular paradigm corresponds to an element in the special words dictionary. This correspondence is indicated by pointer structure 40. The entries of the special word dictionary provide grammatical and inflectional information relating to each inflectional form.

Referring to FIG. 4, pointer elements 40A provide an interconnection between the word code array entries and the special word dictionary entries. As above, this interconnection results where the addresses stored within the word code array address corresponding entries in the special word dictionary, which entries, in turn, address the word code array. See, for example, the word code array entries corresponding to the main dictionary fully irregular paradigm expressions, e.g., "had", "has", "have", "having", which address the special word dictionary by way of pointer elements 40A. In turn, the special word dictionary entries address the main dictionary base form expression, i.e., "have", by way of pointer elements 40B. As further indicated by pointer elements 46A, 46B, 46C, each entry within the special word dictionary 34 includes the address of the base form entry within that dictionary.

In addition to addressing information, each entry of the special word dictionary includes information pertaining to the grammatical and inflectional classification of the inflected expression. The particular contents of each entry are listed in the table below, for the same embodiment of Table I.

TABLE IV an uncompressed representation of the fully irregular paradigm expression;

a 4-bit string encoding the expression grammatical tags—the first bit is set if the expression is an adjective; the second bit is set if the expression is a noun; the third bit is set if the expression is an adverb; and, the fourth bit is set if the expression is a verb;

a 7-bit string pertaining to the expression's inflectional information—the first bit is set if the expression is plural; the second bit is set if the expression is possessive; the third bit is set if the expression is a verbal present participle; the fourth bit is set if the expression is a verbal third person singular; the fifth bit is set if the expression is a verbal past tense; and the sixth bit is set if the expression is a verbal past participle; the seventh bit is set if the expression forms part of another partially irregular paradigm;

the address within the special word dictionary of the base form of the fully irregular paradigm; and the address within the main dictionary of the base form expression.

Figure 5:
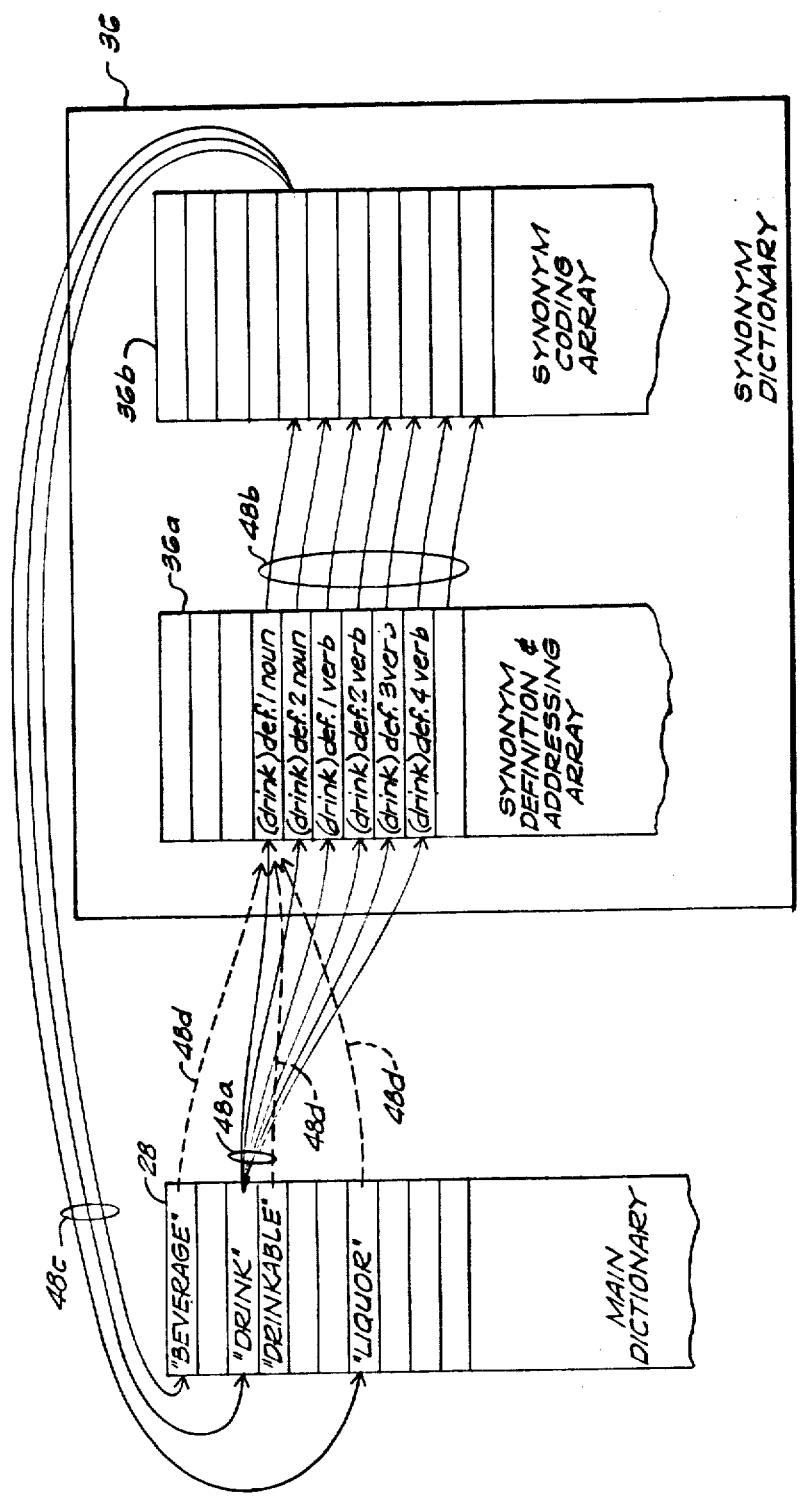
FIG. 5 is a block schematic representation of one aspect of the invention depicting the interrelationship of the main dictionary and the synonym dictionary.

FIG. 5 depicts an interrelationship between the main dictionary 28 and the synonym dictionary 36 according to the illustrated embodiment of the invention. Linguistically related base form entries of the main dictionary 28 correspond with definitionally oriented entries of a first section of the synonym dictionary. In turn, each of these definitionally oriented entries corresponds to an addressing element of a second section of the synonym dictionary. Each of these elements, in turn, address the base forms within the main dictionary which are linguistically related to each other. In this manner, the illustrated embodiment facilitates the identification of definitionally related base form expressions. Once identified, these expressions can be inflected similarly to a designated input expression. While FIG. 5 and the discussion below relate to the identification of synonymous expressions, the mechanism is equally well suited for representing antonomy or other linguistic interrelationships.

Referring to FIG. 5, the synonym dictionary 36 includes a synonym definition and addressing array 36A and a synonym coding array 36B. The addressing array 36A includes an entry corresponding to each definitional aspect of the base form expressions represented in the main dictionary 28. That is, for example, the main dictionary base form expression "drink" has both verbal and nominal grammatical aspects. Further, each of these grammatical aspects provides varying definitional aspects. As a particular example, "drink" has four verbal definitions: "to take into the mouth and swallow a liquid"; "to take alcoholic liquor, especially excessively or habitually"; "to salute by raising and drinking from a glass"; and, "to take in moisture or liquid". Two nominal definitions of the expression are: "any liquid that is fit for drinking" and "an act of drinking or the amount swallowed".

In the aforementioned example, each grammatical and definitional aspect of the expression "drink" is associated with a particular set of related expressions. The aforementioned first verbal definition, for example, corresponds to the expressions "imbibe", "quaff", "sip", among others. The first nominal definition, on the other hand, corresponds to the related base form expressions "beverage", "drinkable", and "liquor".

In addition to encoding a definition for each grammatical-definitional aspect of a base form expression, the entries within the synonym addressing array 36A include addressing information directed to entries within the synonym coding array 36B. Each entry of the coding array 36B, in turn, lists the addresses of those base form expressions within the main dictionary which are grammatically and definitionally related. In a preferred embodiment, the addresses contained in each coding array entry are stored in frequency related order. This manner of storage facilitates, for example, the retrieval and display of linguistically related expressions in a most commonly-used to least commonly-used sequence.

The pointer structure, i.e., cross-reference addressing, which reflects the linguistic interrelationships discussed above is illustrated by way of pointer elements 48A, 48B, and 48C. In particular, pointer elements 48A are directed from base form expression in the main dictionary 28 to grammatical-definitional entries in the synonym definition and addressing array 36A. In turn, the entries of this array are directed, via pointer elements 48B, to entries within the synonym coding array 36B. Via pointer elements 48C, each element of the synonym coding array is directed to synonymous base forms within the main dictionary 28.

The pointer structure interconnecting the main dictionary 28 and the synonym dictionary 36 also includes pointer elements 48D, indicated by dashed lines, which are similar, in part, to aforementioned element 48A. These elements are directed from a grammatically and definitionally related base form set within the main dictionary to a single entry of the synonym addressing array 36A. That is, in addition to being directed from the word "drink" to each of the words "beverage", "drinkable", and "liquor", the pointer structure is also directed from each of these later terms to the word "drink", as well as being directed among each of these later terms themselves. In consequence, the linguistic interrelationships indicated by the pointer structure 48 are commutative and transitive. That is, if a first database inquiry directed to obtaining relations synonymous with a first expression reveals a second expression, a second database inquiry directed to the second expression will necessarily reveal the first expression. For example, an inquiry directed to synonyms for the first nominal definition of "drink" will reveal, inter alia, the expression "beverage", while a second inquiry directed to expressions synonymous with the expression "beverage", will reveal, inter alia, the expression "drink".

Moreover, according to interrelationship transitivity, where a first expression is related to a second expression and, in turn, the second expression is related to a third expression, the first expression is necessarily related to the third expression. For example, as the expression "drink" is synonymous with the expression "beverage" and the expression "beverage" is synonymous with the expression "liquor", the expression "drink" is necessarily synonymous with the expression "liquor".

The pointer elements 48A, 48D directed from the main dictionary base forms to the synonym addressing array may be provided by additional addressing fields corresponding with each main dictionary entry. This aspect of the pointer structure may also be practiced through the inclusion of interface software which responds to input base form expressions and grammatical-definitional information to produce output expressions representative of the related base forms.

Figure 6:
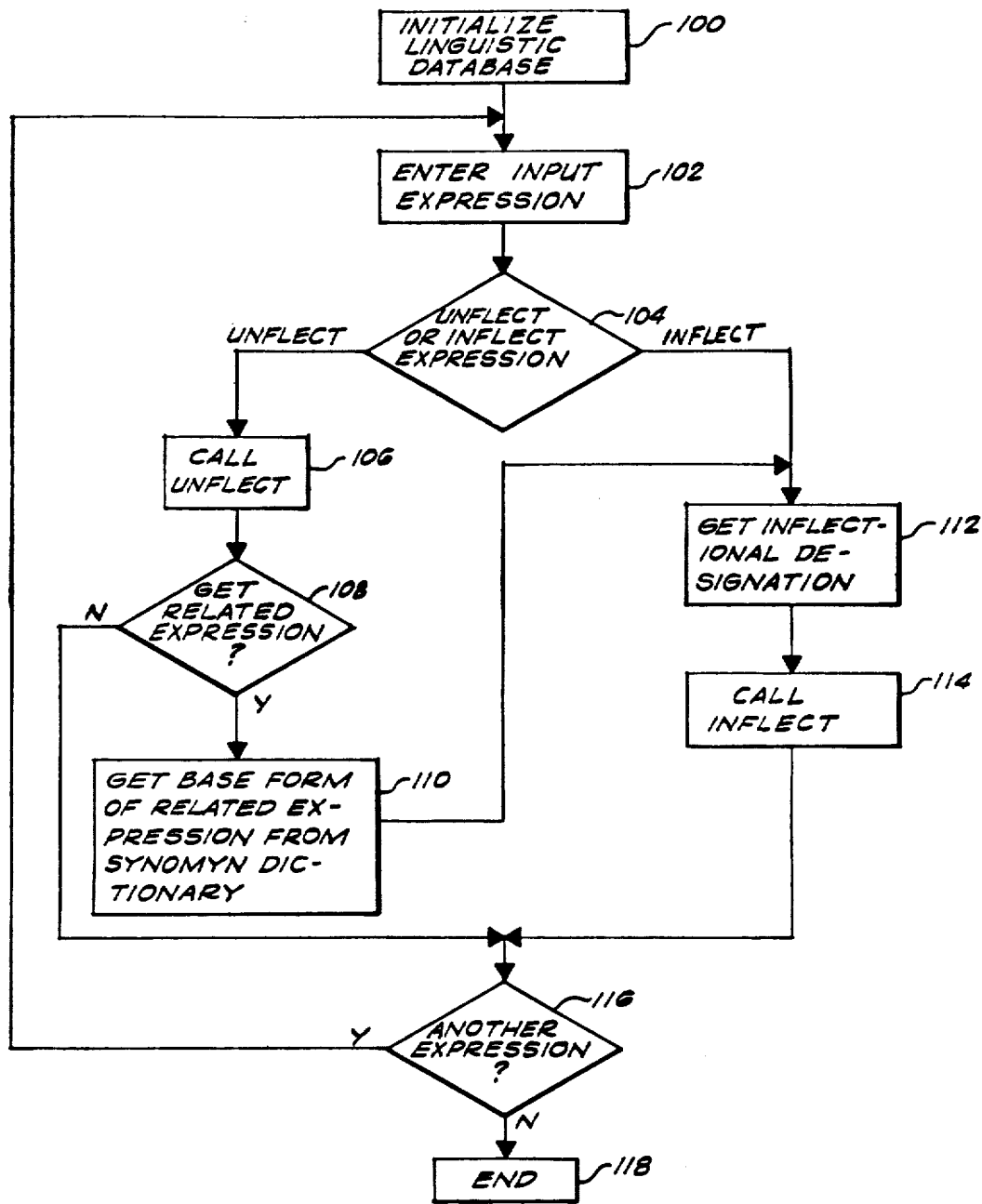
FIG. 6 is a flow chart depicting the operation sequence of an expression processor according to one aspect of the invention.

FIG. 6 depicts a processing sequence for determining the grammatical and inflectional characteristics of an input expression and for producing a list of similarly inflected expressions. The illustrated sequence is of the type which may be employed in a text processing system for facilitating the correction of processed documents. In step 100, the process initializes the linguistic database. This initialization sequence involves, inter alia, setting initial values for program variables and loading the database, including the main dictionary, the word code array, the exception dictionaries, the special word dictionary, and the synonym dictionary.

Expressions for loading the main dictionary may be found in a standard English dictionary, e.g., *The American Heritage Dictionary*. In accord with the discussion above, the main dictionary is loaded with adverbs, adjectives, base form expressions of regular paradigms, base form and exceptional inflected expressions of partially irregular paradigms, and fully irregular paradigm expressions. The base form exception dictionary is loaded with grammatical and inflectional information pertaining to the "regular" inflected forms of the partially irregular paradigm expressions, while the inflected form exception dictionary is loaded with grammatical and inflectional information pertaining to the exceptional inflected forms. The special word dictionary is loaded with information pertaining to fully irregular paradigm expressions. The word code array is loaded with grammatical and inflectional information for the regular paradigm base forms, and with addressing information, directed to the exception dictionaries and the special word dictionary, for the partially irregular paradigm and fully irregular paradigm expressions. Text representing the preferred contents of the exception dictionaries and the special word dictionary is presented in Appendix I.

Information for loading the synonym dictionary may be taken from a standard English thesaurus, e.g., *Roget's II: The New Thesaurus*. The synonym dictionary coding section is loaded with addresses directed to grammatically and definitionally related, e.g., synonymous or antonymous, base form expressions of the main dictionary. Subsequently, the synonym dictionary definition and addressing section is loaded with definitions corresponding to each base form usage and with the addresses of the coding section addressing entries.

In step 102, the process accepts an input expression. This expression may be entered by the user at the keyboard, or accepted from the central processing unit during a text processing task. Subsequently, in step 104, the process branches according to the desired function, i.e., either inflecting the input expression or unflecting—identifying the base form—of that expression. If the input expression is to be unflected, the process proceeds to step 106, where it invokes the routine UNFLECT. As discussed in conjunction with FIG. 7, this routine determines the base form of the expression and its grammatical and inflectional information. In one embodiment of the invention, in the event that the input expression includes two parts, e.g., the two-part verbal form "came up" (as in: "they came up the hill"), only one part is typically passed to UNFLECT, e.g., the verbal form "came".

Upon the return from the UNFLECT routine, the process proceeds to step 108. There, according to instructions entered by the user or according to a precoded sequence, the process obtains a list of expressions linguistically related, e.g., synonymous or antonymous to, the input expression, step 110. This list is generated by reference to the synonym dictionary. According to one embodiment of the invention, in the event the input expression includes two parts, e.g., "came up", the corresponding two-part base form expression, e.g., "come up", constructed from the output of UNFLECT, is used in referencing the synonym dictionary and determining the set of linguistically related expressions. Subsequently, the process proceeds to step 112.

In step 112, the process accepts a designation indicating the desired inflectional form to be produced by the INFLECT routine from a specified base form expression. This designation typically includes a grammatical classification and an inflectional classification. In a preferred embodiment of the invention, which utilizes both the UNFLECT and INFLECT routines, these classifications are provided as output from the UNFLECT routine. These classifications may also be entered by the user via a keyboard, or provided by the central processing unit during a text processing task. In step 114, the process calls the INFLECT routine to generate the requested inflectional form of the base form expression.

Subsequent to either of steps 108 or 114, the process determines whether another expression is to be analyzed. If so, the process proceeds to step 102; otherwise the process terminates at step 118.

Figure 7:
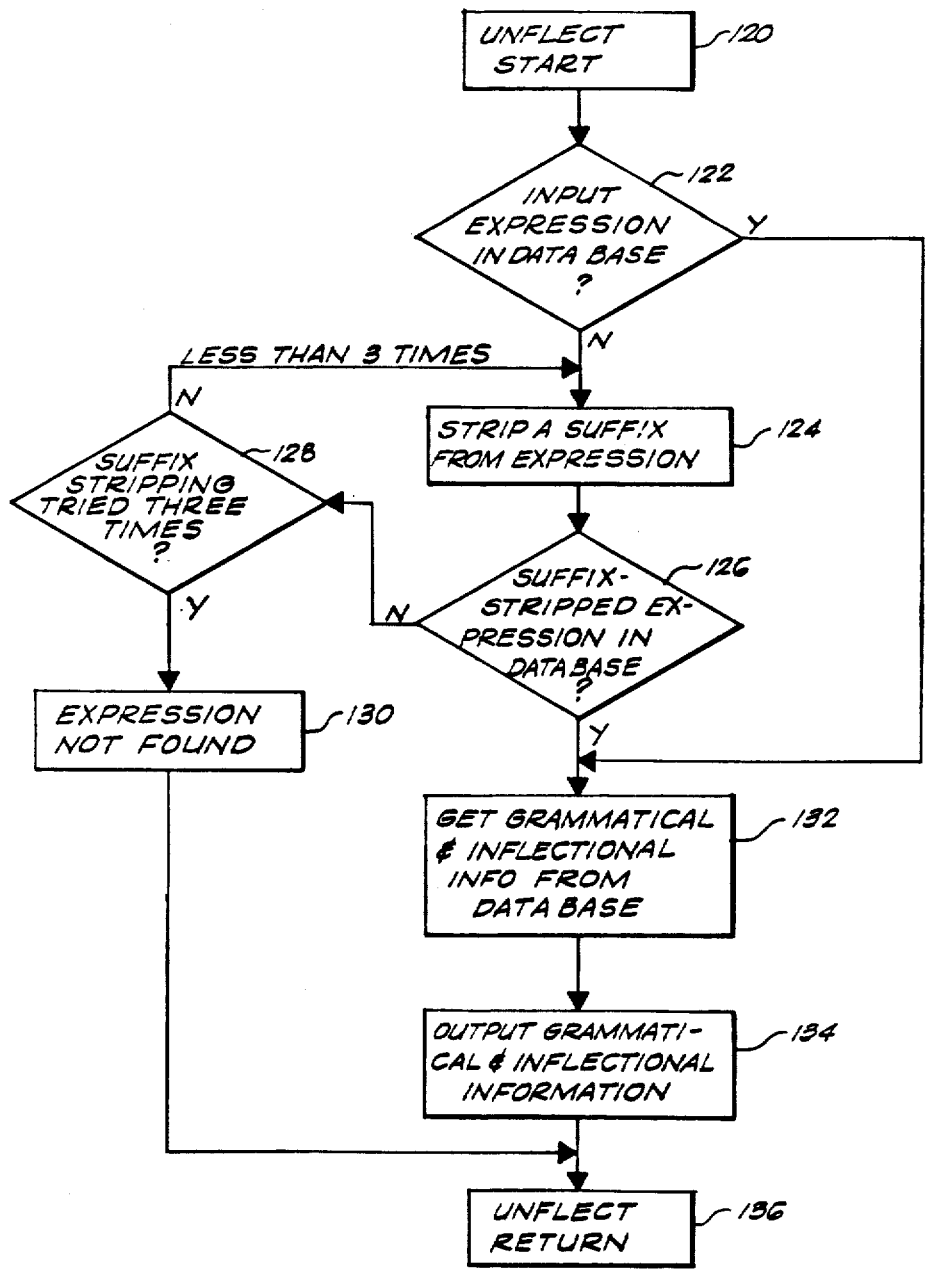
FIG. 7 is a flow chart depicting the operational sequence of the UNFLECT routine; and, FIG. 8 is a flow chart depicting the operational sequence of the INFLECT routine.

FIG. 7 depicts a preferred operating sequence for the UNFLECT routine, beginning at step 120. This routine analyzes an expression to determine its grammatical and inflectional characteristics. A more detailed operating sequence for the routine is presented in Appendix II. In step 122, the process determines whether the expression, as input, is in the database. If not, the process proceeds to step 124. There, the process examines the ending of the expression to identify suffix-like characters. These characters, if present, are stripped, and the resultant expression is matched against the database entries. If no such expression is found in the database, the process proceeds through step 128 to step 124. If, on the other hand, the suffix-stripped expression is found in the database, the process can proceed to step 132. Alternatively, the process can compare the suffix with the grammatical and inflectional type of the expression to determine whether the suffix is linguistically permissible.

In step 128, the process determines whether at least three putative suffixes have been stripped from the input expression. If so, the input expression is deemed not to have been found in the dictionary, step 130, and the process returns to the calling routine.

If the input expression, or a suffix-stripped expression, is found in the database, the process proceeds to step 132. There the grammatical and inflectional information pertaining to the input expression is obtained from the database. In step 134, this information is output to the calling routine. The process returns to the calling routine at step 136.

Figure 8:
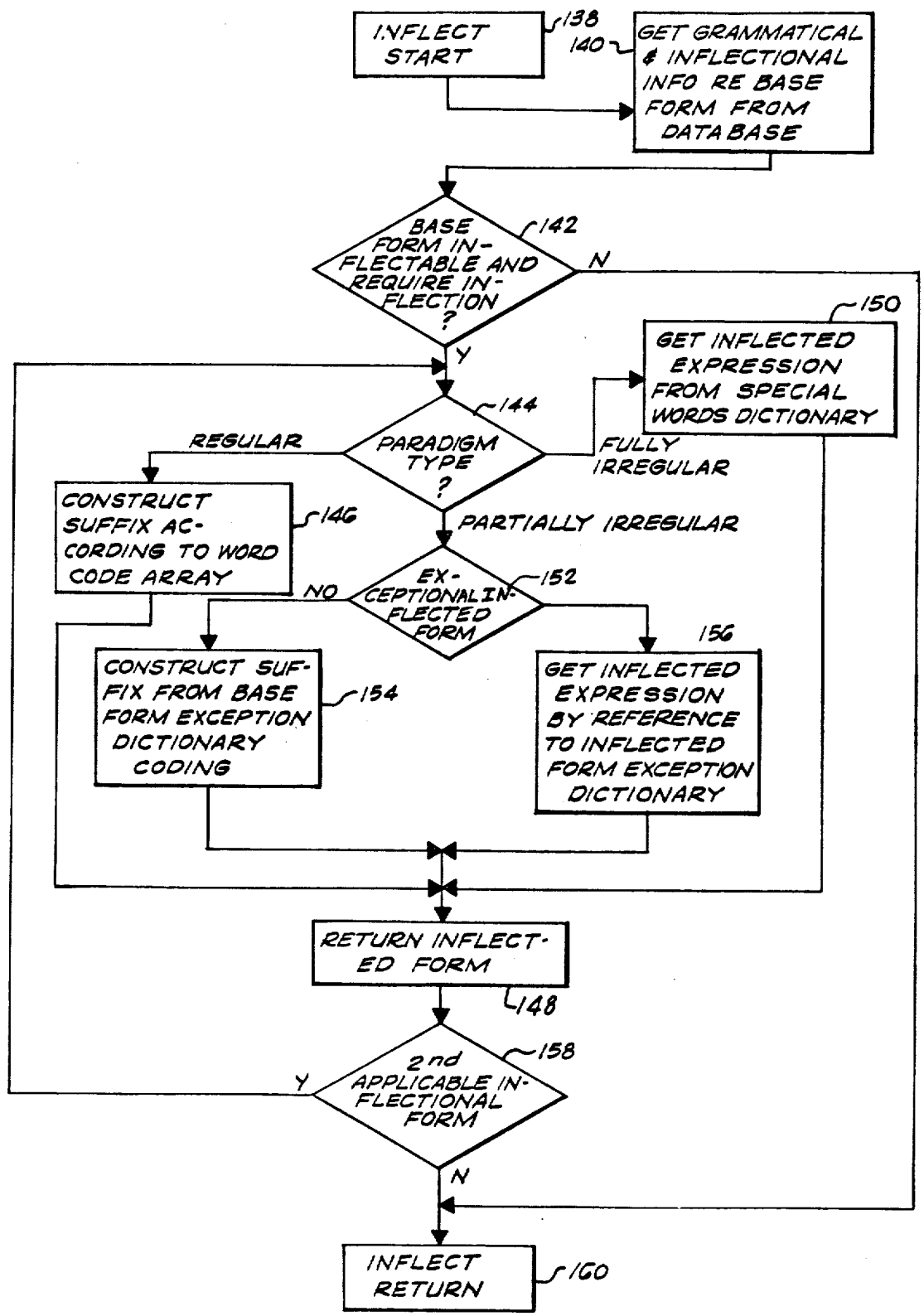

The INFLECT process is presented in a FIG. 8, beginning at step 138. This process produces a requested inflected form of an input base form expression. A more detailed operating sequence for the routine is presented in Appendix III. In step 140, the process references the database to obtain full grammatical and inflectional information pertaining to the base form. In step 142, this information is examined to determine whether the base form is inflectable in accord with the designation and, indeed, requires inflection. If so, the process proceeds to step 144.

In step 144, the paradigm type of the base form is examined to determine process flow. If the base form is an element of a regular paradigm, the inflection suffix is constructed according to the paradigm coding of the word code array 30 (FIG. 2). If the base form is an element of a fully irregular paradigm, the requested inflected expression is obtained from the special words dictionary 34 (FIG. 2). Further, if the base form is an element of a partially irregular paradigm, the process proceeds to step 152. There, if the requested inflectional form is not exceptional, a suffix is constructed by reference to the base form exception dictionary 32 (FIG. 2). If, on the other hand, the requested inflection is exceptional, the suffix information is determined from the inflected form exception dictionary.

Subsequent to constructing the requested inflectional form, the process proceeds to step 148, where the inflected form is returned to the calling routine.

In step 158, the process determines whether a second inflected form of the input base form expression matches the grammatical-inflectional designation. For example, if the base form to be inflected is "be", and the requested inflection is present tense, both "am" and "are" are valid inflected forms. According to step 158, if two such forms exist, the process proceeds to step 144, where the second form is constructed. In step 160, the process returns to the calling routine.

In accord with the description above, the invention provides a system for storing and retrieving linguistic information. In one aspect, the invention provides a system for storing linguistic expressions, which system includes a main dictionary storage section and three coding sections, one for each of regular paradigm information, partially irregular paradigm information, and fully irregular paradigm information. In another aspect, the invention provides a system for evaluating a linguistic express, e.g., a word, and determining its grammatical and inflectional information. Other aspects of the invention provide an electronic thesaurus.

Those skilled in the art may make changes in the described embodiment, and in other teachings herein, for further practice which is within the scope of the invention described and claimed herein.

APPENDIX I

PARTIALLY IRREGULAR PARADIGM TABLE

| Base Form | Exceptional Inflected Form |
|---|---|
| analysis | analyses |
| antithesis | antitheses |
| apotheosis | apotheoses |
| arise | arisen |
| arise | arose |
| awake | awoke |
| awake | awoken |
| basis | bases |
| bear | bore |
| bear | borne |
| beat | beaten |
| become | became |
| befall | befallen |
| befall | befell |
| beget | begat |
| beget | begotten |
| begin | began |
| begin | begun |
| begird | begirt |
| behold | beheld |
| bend | bent |
| bereave | bereft |
| beseech | besought |
| beseech | beseeched |
| bestride | bestrode |
| bestride | bestridden |
| bid | bidden |
| bind | bound |
| bite | bit |
| bite | bitten |
| bleed | bled |
| blow | blew |
| blow | blown |
| bondsman | bondsmen |
| break | broke |
| break | broken |
| breed | bred |
| bring | brought |
| build | built |
| burn | burned |
| burn | burnt |
| buy | bought |
| catch | caught |
| catharsis | catharses |
| chide | chidden |
| chide | chided |
| child | children |
| choose | chose |
| choose | chosen |
| churchman | churchmen |
| cleave | cleaved |
| cleave | cleft |
| clergyman | clergymen |
| cling | clung |
| come | came |
| countryman | countrymen |
| creep | crept |
| crisis | crises |
| crow | crew |
| crow | crowed |
| deal | dealt |
| dig | dug |
| dive | dived |
| dive | dove |
| do | did |

-continued

PARTIALLY IRREGULAR PARADIGM TABLE

| Base Form | Exceptional Inflected Form |
|---|---|
| do | done |
| draw | drawn |
| draw | drew |
| dream | dreamed |
| dream | dreamt |
| drink | drank |
| drink | drunk |
| drive | driven |
| drive | drove |
| dwell | dwelled |
| dwell | dwelt |
| eat | ate |
| eat | eaten |
| emphasis | emphases |
| engird | engirt |
| fall | fallen |
| fall | fell |
| feed | fed |
| feel | felt |
| fight | fought |
| find | found |
| flee | fled |
| fling | flung |
| forbear | forbore |
| forbear | forborne |
| forbid | forbade |
| forbid | forbidden |
| foreman | foremen |
| foresee | foresaw |
| foresee | foreseen |
| foretell | foretold |
| forethink | forethought |
| forget | forgot |
| forget | forgotten |
| forgive | forgave |
| forgive | forgiven |
| forsake | forsaken |
| forsake | forsook |
| forswear | forswore |
| forswear | forsworn |
| freshman | freshmen |
| get | got |
| get | gotten |
| gird | girt |
| give | gave |
| give | given |
| go | gone |
| go | went |
| grind | ground |
| grow | grew |
| grow | grown |
| hang | hanged |
| hang | hung |
| hear | heard |
| heave | heaved |
| heave | hove |
| henchman | henchmen |
| hew | hewed |
| hew | hewn |
| hide | hid |
| hide | hidden |
| hold | held |
| hypothesis | hypotheses |
| keep | kept |
| know | knew |
| know | known |
| lead | led |
| lean | leaned |
| lean | leant |
| leap | leaped |
| leap | leapt |
| learn | learned |
| learn | learnt |
| leave | left |
| lend | lent |
| light | lighted |
| light | lit |
| lose | lost |

PARTIALLY IRREGULAR PARADIGM TABLE

| Base Form | Exceptional Inflected Form |
|---|---|
| make | made |
| man | men |
| mean | meant |
| meet | met |
| metamorphosis | metamorphoses |
| mislead | misled |
| mistake | mistaken |
| mistake | mistook |
| misunderstand | misunderstood |
| mow | mowed |
| mow | mown |
| outdo | outdid |
| outdo | outdone |
| outthink | outthought |
| outwear | outwore |
| outwear | outworn |
| overcome | overcame |
| overhang | overhung |
| overrun | overran |
| overtake | overtaken |
| overtake | overtook |
| overthrow | overthrew |
| overthrow | overthrown |
| ox | oxen |
| parenthesis | parentheses |
| patrolman | patrolmen |
| plead | pleaded |
| plead | pled |
| policeman | policemen |
| prognosis | prognoses |
| prove | proved |
| prove | proven |
| rend | rent |
| ring | rang |
| ring | rung |
| rise | risen |
| rise | rose |
| run | ran |
| say | said |
| seaman | seamen |
| seek | sought |
| self | selves |
| sell | sold |
| send | sent |
| shake | shaken |
| shake | shook |
| shear | sheared |
| shear | shorn |
| shine | shined |
| shine | shone |
| shoot | shot |
| show | showed |
| show | shown |
| shrink | shrank |
| shrink | shrunk |
| sing | sang |
| sing | sung |
| sink | sank |
| sink | sunk |
| sit | sat |
| slay | slain |
| slay | slew |
| sleep | slept |
| sling | slung |
| smell | smelled |
| smell | smelt |
| smite | smitten |
| smite | smote |
| sow | sowed |
| sow | sown |
| speak | spoke |
| speak | spoken |
| speed | sped |
| spell | spelled |
| spell | spelt |
| spend | spent |
| spill | spilled |
| spill | spilt |
| spin | spun |
| spoil | spoiled |
| spoil | spoilt |
| spokesman | spokesmen |
| spring | sprang |
| spring | sprung |
| stand | stood |
| stastis | stases |
| stave | staved |
| stave | stove |
| steal | stole |
| steal | stolen |
| stick | stuck |
| sting | stung |
| stink | stank |
| stink | stunk |
| strew | strewed |
| strew | strewn |
| stride | stridden |
| stride | strode |
| strike | struck |
| string | strung |
| swear | swore |
| swear | sworn |
| sweep | swept |
| swell | swelled |
| swell | swollen |
| swim | swam |
| swim | swum |
| swing | swung |
| tailor-make | tailor-made |
| take | taken |
| take | took |
| teach | taught |
| tear | tore |
| tear | torn |
| tell | told |
| tenderfoot | tenderfeet |
| thesis | theses |
| thief | thieves |
| think | thought |
| thrive | thrived |
| thrive | throve |
| throw | threw |
| throw | thrown |
| tradesman | tradesmen |
| tread | trod |
| tread | trodden |
| tuberculosis | tuberculoses |
| unbend | unbent |
| unbind | unbound |
| undergo | undergone |
| undergo | underwent |
| understand | understood |
| undertake | undertook |
| undertake | undertaken |
| undo | undid |
| undo | undone |
| unwind | unwound |
| uphold | upheld |
| wake | woke |
| wake | woken |
| wear | wore |
| wear | worn |
| weave | wove |
| weave | woven |
| weep | wept |
| win | won |
| wind | wound |
| withdraw | withdrawn |
| withdraw | withdrew |
| withhold | withheld |
| withstand | withstood |
| workingman | workingmen |
| workman | workmen |
| wreak | wrought |
| wring | wrung |
| write | written |

PARTIALLY IRREGULAR PARADIGM TABLE

| Base Form | Exceptional Inflected Form |
|---|---|
| write | wrote |

FULLY IRREGULAR PARADIGM TABLE

| Base Form | Irregular Inflected Form | Related Base Form |
|---|---|---|
| be | be | |
| | am | |
| | is | |
| | are | |
| | was | |
| | were | |
| | been | |
| | being | |
| being | being | be |
| | being's | |
| | beings | |
| | beings' | |
| have | have | |
| | has | |
| | had | |
| | having | |
| fly | fly | |
| | fly's | |
| | flies | |
| | flies' | |
| | flew | |
| | flown | |
| | flying | |
| foot | foot | |
| | foot's | |
| | foots | |
| | footed | |
| | footing | |
| | feet | |
| | feet's | |
| footing | footing | foot |
| | footing's | |
| | footings | |
| | footings' | |
| lie | lie | |
| | lie's | |
| | lies | |
| | lies' | |
| | lied | |
| | lay | |
| | lain | |
| | lying | |
| lay | lay | lie |
| | lays | |
| | laid | |
| | laying | |
| live | live | |
| | lives | |
| | lived | |
| | living | |
| life | life | |
| | life's | |
| | lives | live |
| | lives' | |
| living | living | live |
| | living's | |
| | livings | |
| | livings' | |
| see | see | |
| | sees | |
| | saw | |
| | seen | |
| | seeing | |
| saw | saw | see |
| | saw's | |
| | saws | |
| | saws' | |
| | sawed | |
| | sawn | |
| | sawing | |

FULLY IRREGULAR PARADIGM TABLE

| Base Form | Irregular Inflected Form | Related Base Form |
|---|---|---|
| seeing | seeing | see |
| | seeing's | |
| | seeings | |
| | seeings' | |

APPENDIX II

The UNFLECT Routine

An operating sequence for the UNFLECT process, discussed above in conjunction with FIG. 7, is presented below. In the sequence, the variable "Word" represents the input expression which is to be unflected. The variable "Level" indicates that one or two base form expressions are associated with the input expression. The variable "Possessive" is a flag indicating that the input expression is a possessive noun form. The variable "Test" temporarily stores forms of the input expression. The variable "Base-tag flags" indicates the grammatical classification of the input expression, while the variable "Inflection flags" indicates the inflectional class of the input expression. The variable "Doubled" is a flag indicating whether the stem-final consonant of the input expression is doubled.

Moreover, in the sequence, the function RTVWRDS locates an expression in the main dictionary. The first parameter in the RTVWRDS calling sequence identifies the expression to be located. The second parameter of the calling sequence identifies the level of that expression, i.e., whether it is the first or the second base form of the input expression.

```
Set Level to 1;
If Word is less than 3 letters long,
    Then do:
        Look it up by calling RTVWRDS(Word,1);
        Go to Endit;
    End;
If the final two letters of Word are /s'/,
    Then do;
        Set Possessive flag;
        Remove the apostrophe from the end of Word;
    End;
Else if the final two letters of Word are /'s/,
    Then do;

Set Test to Word minus its final two letters;
        Call RTVWRDS(Test,1);
        If Test was found in the dictionary,
            Then do;
                Set Possessive flag;
                If Test was found in the special words' dictionary,
                    Then go to Spex;
                If Base-tag flags contain +[noun] or if Word
                        is +[uninflectable],
                    Then do;
                        Set Base-tag flags to +[noun] only;
                        Set Possessive flag;
                    End;
                Else reset to not found;
            Go to Endit;
    End;
Call RTVWRDS(Word,1);
If Word was found in the dictionary,
    Then if Word was found in the special words' dictionary,
        Then do;
            Spex:
            If Possessive flag has been set,
                Then do;
                    Reset Word information to +[possessive];
                    Modify the transfer pointer to refer to the
                        correct inflected form;
                End;
            If Base-flag indicates that a second base form exists,
                Then set Level to 2 and get the additional information
                    from the special words' dictionary;
            Go to Endit;
        End;
    Else do;
        If Possessive flag has been set,
            Then reset Word information to +[possessive];
        If +[uninflectable] or Possessive flag has not been set, Set Level to 2;
    End;
If the final letter of Word is /s/,
    Then do;
        Set Test to Word minus its final /s/;
        Call RTVWRDS(Test,Level);
        If Test was found in the dictionary,
            Then do;
                Set Base-tag flags to -[adjective,adverb];
                If Base-Tag flags contain +[noun],
                    Then if Possessive flag has been set,
                        Then set Inflection flags to +[plural,possessive];
                        Else set Inflection flags to +[plural];
```

```
If Base-Tag flags contain +[verb],
    Then if Possessive flag has not been set,
        Then if Inflection flag is +[infinitive],
            Then set Inflection flags to
                +[third person singular];
            Else set Base-tag flags to -[verb];
        Else set Base-tag flags to -[verb];
If Base-Tag flags contain neither +[verb] nor +[noun],
    Then reset to not found;
    Else go to Endit;
End;
If Test was not found in the dictionary,
    Then if the final letter of Test is /e/,
        Then do;
            Remove the /e/ from the end of Test;
            Call RTVWRDS(Test,Level);
            If Test was not found in the dictionary,
                Then do;
                    If the last two letters of Test are doubled,
                        Then do;
                            Remove the last letter of Test;
                            Call RTVWRDS(Test,Level);
                        End;
                End;
            Else if the final letter of Test is /i/,
                Then do;
                    Replace the final /i/ of Test with /y/;
                    Call RTVWRDS(Test,Level);
                End;
        End;
    If Test was found in the dictionary,
        Then do;
            Set Base-tag flags to -[adjective,adverb];
            If Base-Tag flags contain +[noun],
                Then if Possessive flag has been set,
                    Then set Inflection flags to +[plural,possessive];
                    Else set Inflection flags to +[plural];
            If Base-Tag flags contain +[verb],
                Then if Possessive flag has not been set,
                    Then if Inflection flag is +[infinitive],
                        Then set Inflection flags to +[third person singular];
                        Else set Base-tag flags to -[verb];
                    Else set Base-tag flags to -[verb];
            If Base-Tag flags contain neither +[verb] nor +[noun],
                Then reset to not found;
        End;
End;
Else if the final two letters of Word are /ed/,
    Then do;
        Set Test to Word minus its final /ed/;
        If the final two letters of Test are equal,
            Then do;
                Set Doubled flag;
                Remove the final letter from Test;
            End;
        Call RTVWRDS(Test,Level);
        If Test was found in the dictionary,
            Then if the Doubling flag in Base-info and the Doubled flag set above
                do not match,
                Then reset Test to not found;
```

```
            Else do;
                If Base-tag flags contain +[verb],
                    Then if Inflection flag is +[infinitive],
                        Then do;
                            Set Inflection flags +[past tense,past participle]
                            Set Base-tag flags to +[verb] only;
                            If verb is in Class 4,
                                Then reset to Class 1;
                            Go to EndIt;
                        End;
                        Else reset to not found;
                    Else reset to not found;
            End;
        If Test was not found in the dictionary,
            Then do;
                If Doubled flag has been set,
                    Then double the final letter of Test;
                Else if the final letter of Test is /l/,
                    Then replace it with /y/;
                Else add an /e/ to the end of Test;
                Call RTVWRDS(Test,Level);
            End;
        If Test was found in the dictionary
            Then if Base-tag flags contain +[verb],
                Then if Inflection flag is +[infinitive],
                    Then do;
                        Set Inflection flags +[past tense,past participle]
                        Set Base-tag flags to +[verb] only;
                        If verb is in Class 4,
                            Then reset to Class 1;
                    End;
                    Else reset to not found;
                Else reset to not found;
    End;
    Else if the final three letters of Word are /ing/,
        Then do;
            Set Test to Word minus its final three letters;
            If the final two letters of Test are equal,
                Then do;
                    Set Doubled flag;
                    Remove final letter from Test;
                End;
            Call RTVWRDS(Test,Level);
            If Test was found in the dictionary,
                Then if the Doubling flag in Base-info and the Doubled flag set above
                    do not match,
                    Then reset Test to not found;
                Else do;
                    If Base-tag flags contain +[verb],
                        Then if Inflection flag is +[infinitive],
                            Then do;
                                Set Inflection flags +[present participle];
                                Set Base-tag flags to +[verb] only;
                                Go to EndIt;
                            End;
                            Else reset to not found;
                        Else reset to not found;
                End;
            If Test was not found in the dictionary,
                Then do;
```

APPENDIX III

The INFLECT Routine

An operating sequence for the INFLECT process, discussed above in conjunction with FIG. 8, is provided below. In the listing, the variable "Base-loc" indicates the address within the main dictionary of the input base form which is to be inflected. The variable "Ret-infl-form" is the resultant inflected expression returned by INFLECT. The variable "Tag-code" indicates the grammatical classification of "Ret-infl-form" as specified by the calling routine. The variable "Inflection" indicates the inflection of "Ret-infl-form" as indicated by the calling routine. The variable "Base form" represents the base form expression stored at the address "Base-loc" in the main dictionary. The variable "Base-info" represents grammatical and inflectional information corresponding to "Base form". The variable "Xfer-loc" is a temporary variable indicating an address within the database of a second stored inflected expression corresponding to "Base form" The variable "Type-code" indicates a nominal or verbal type-code classification, e.g., nominal class 2. The variable "Exception" indicates whether the base form is in the exception dictionaries or the special words dictionary. The variable "Vbd-form" stores a verbal past tense inflectional form of the input expression, while the variable "Vbn-form" stores a past participal inflectional form of the input expression.

Moreover, in the sequence, the function RTVADDR accepts, as input, the address of a base form expression within the main dictionary and returns the expression stored at that address. The function RTVINFO accepts, as input, the address within the main dictionary of an expression and returns grammatical and inflectional information pertaining to that expression. Moreover, the function RTVFORM returns the regular or irregular inflected form of a specified base formed expression.

```
        If Doubled flag has been set,
            Then double the final letter of Test;
        Else if the final letter of Test is /y/,
            Then replace it with /ie/;
        Else add an /e/ to the end of Test;
        Call RTVWRDS(Test,Level);
    End;
    If Test was found in the dictionary
        Then if Base-tag flags contain +[verb],
            Then if Inflection flag is +[infinitive],
                Then do;
                    Set Inflection flags +[present participle];
                    Set Base-tag flags to +[verb] only;
                End;
                Else reset to not found;
            Else reset to not found;
    End;
Endit;
Do for Level = 1 and 2;
    If the Word corresponding to Level has been found;
        Then if it was in the special words' dictionary,
            Then get the synonym dictionary information by reference to SPEXSTR;
        Else if it was in the exceptional words' dictionary,
            Then if it was not a base form,
                Then get the synonym dictionary information by reference to
                    SPECSTR;
                Else go to Setup;
            Else go to Setup;
    Go to Skipit;
    Setup;
        Get the synonym dictionary by reference to the main dictionary;
    Skipit;
End;
If Word is an uninflectable noun,
    Then set Base-tag flags to +[noun];
Else if Word is Verb Class 4 infinitive,
    Then set Inflection flags to +[past tense, past participle];
If two equal Words have been found,
    Then delete reference to the second one;
Return to calling procedure;
```

Label 2:
If *Inflection* is -[plural, possessive] and *Base-form* is not "be",
    Then go to Label 1;
    Else go to Label 6;

Label 4:
If *Inflection* is -[verbal inflections],
    Then go to Label 1;

Label 6:
If *Base-loc* > zero
    Then if *Base-loc* < 16000
        Then do;
            Obtain the inflectional codes for *Base-form*;
            If *Base-form* is -[exceptional],
                Then do;
                    Set *Xfer-loc* to zero;
                    Set contents of *Base-info* from *Full-info*;
                    If *Base-form* is -[inflectable noun],
                        Then do;
                            Set *Tag* is +[noun],
                            If *Inflection* is +[possessive],
                                Then set *Base-form* to *Base-form* plus /'s/;
                            Go to Label 1;
                        End;
                End;
            If *Base-form* is not in the special words' dictionary,
                Then do;
                    Set *Base-info* to the exception dictionary address
                        obtained from the inflectional codes;
                    Set *Base-flag* to +[base form];
                    Call RTVINFO(*Base-flag,Base-info,Xfer-loc*);
                End;
                Else do;
                    Set *Base-info* to the exception dictionary address
                        obtained from the inflectional codes;
                    If *Base-form* is +[Verb Class 3], Then do;
                          Set inflectional codes;
                          Set *Ret-infl-form* to *Base-form*;
                      End;
                    Else set *Ret-infl-form* to blank;
                Loop through the section of the special words'
                    dictionary corresponding to the given base and
                    add every appropriate form to *Ret-infl-form*;
                Go to Endit;
            End;
    End;
If *Tag-code* is equal to 4
    Then go to Label 5;
Call RTVADDR(*Base-loc,Base-form*) to get the *Base-form* corresponding
    to the dictionary location *Base-loc*;
Go to the Label corresponding to *Tag-code*;

Label 1, Label 3:
Set *Ret-infl-form* to *Base-form*;
Go to Endit;

Else if *Inflection* is +[possessive],
    Then if *Inflection* is +[plural],
        Then do;
            If *Xfer-loc* is equal to zero,
                Then if *Base-form* is +[Noun Class 3]
                    Then set *Ret-infl-form* to *Base-form* with its final /y/
                        replaced by /ies'/;
                Else if *Base-info* is +[Noun Class 2],
                    Then if *Base-info* is +[stem-final doubling]
                        Then set *Ret-infl-form* to *Base-form* plus the last
                            letter of *Base-form* plus /es'/;
                      Else set *Ret-infl-form* to *Base-form* plus /es'/;
                Else set *Ret-infl-form* to *Base-form* plus /s'/;
            Else if *Exception* is +[noun],
                Then do;
                      Set *Type-code* to 2;
                      Call RTVFORM(*Base-form,Xfer-loc,Base-flag,*
                          *Type-code,Infl-form*);
                      Set *Ret-infl-form* to *Infl-form*;
                End;
            Else if *Base-info* is +[Noun Class 2],
                Then if *Base-info* is +[stem-final doubling]
                    Then set *Ret-infl-form* to *Base-form* plus the last
                        letter of *Base-form* plus /es'/;
                Else set *Ret-infl-form* to *Base-form* plus /es'/;
            Else set *Ret-infl-form* to *Base-form* plus /s'/;
        Go to Endit;
    End;
    Else do;
        Set *Ret-infl-form* to *Base-form* plus /'s/;
        Go to Endit;
    End;
Else if *Inflection* is +[plural],
    Then do;
        If *Xfer-loc* is equal to zero,
            Then if *Base-info* is +[Noun Class 3],
                Then set *Infl-form* to *Base-form* with its final /y/
                      replaced by /ies/;
            Else if *Base-info* is +[Noun Class 2],
                Then if *Base-info* is +[stem-final doubling]
                    Then set *Ret-infl-form* to *Base-form* plus the last
                        letter of *Base-form* plus /es/;
                Else set *Ret-infl-form* to *Base-form* plus /es/;
            Else set *Ret-infl-form* to *Base-form* plus /s/;
        Else if *Exception* is +[noun],
            Then do;
                Set *Type-code* to 1;
                Call RTVFORM(*Base-form,Xfer-loc,Base-flag,Type-code,*
                      *Infl-form*);
            End;
        Else if *Base-info* is +[Noun Class 2],
            Then if *Base-info* is +[stem-final doubling]
                Then set *Ret-infl-form* to *Base-form* plus the last
                      letter of *Base-form* plus /es/;
                Else set *Ret-infl-form* to *Base-form* plus /es/;
            Else set *Ret-infl-form* to *Base-form* plus /s/;
        Set *Ret-infl-form* to *Infl-form*;
        Go to Endit;
    End;
Set *Ret-infl-form* to *Infl-form*;
Go to Endit;

Label 5:
If *Inflection* is +[third-person singular verb]
 Then do;
  If *Base-info* is +[Verb Class 3],
   Then set *Infl-form* to *Base-form* with its final /y/
    replaced by /ies/;
  Else if *Base-info* is +[Verb Class 2],
   Then if *Base-info* is +[stem-final doubling],
    Then set *Infl-form* to *Base-form* plus the last
     letter of *Base-form* plus /es/;
   Else set *Infl-form* to *Base-form* plus /es/;
  Else set *Infl-form* to *Base-form* plus /s/;
  Set *Ret-Infl-form* to *Infl-form*;
  Go to Endit;
 End;
Else if *Inflection* is +[present participle],
 Then do;
  If *Base-info* is +[stem-final doubling],
   Then set *Infl-form* to *Base-form* plus the last
    letter of *Base-form* plus /ing/;
  Else do;
   If the last letter of *Base-form* is /e/,
    Then if the penultimate letter of *Base-form* is not equal
     to /e/ or /o/,
     Then do;
      If the penultimate letter of *Base-form* is /i/,
       Then replace it with /y/;
      Remove the last letter of *Base-form*;
     End;
   Set *Infl-form* to *Base-form* plus /ing/;
  End;
  Set *Ret-infl-form* to *Infl-form*;
  Go to Endit;

End;
If *Base-info* is +[Verb Class 4],
 Then if *Inflection* is +[infinitive],
  Then do;
   Set *Ret-infl-form* to *Base-form*;
   Go to Endit;
  End;
 Else set *Inflection* to +[infinitive, past tense, past participle].
Set *Vbd-form* and *Vbn-form* to blank;
If *Xfer-loc* is not equal to zero,
 Then do;
  If *Inflection* is +[past tense],
   Then do;
    Set *Type-code* to 3;
    If *Exception* is +[verb],
     Then call RTVFORM(*Base-form*,*Xfer-loc*,*Base-flag*,
      *Type-code*,*Vbd-form*);
     Else set *Xfer-loc* to zero;
   End;
  If *Inflection* is +[past participle],
   Then do;
    Set *Type-code* to 4;
    If *Exception* is +[verb],
     Then call RTVFORM(*Base-form*,*Xfer-loc*,*Base-flag*,
      *Type-code*,*Vbn-form*);
     Else set *Xfer-loc* to zero;
   End;

```
        End;
f Xfer-loc is equal to zero,
    Then do;
        If Inflection is +[infinitive],
            Then set Infl-form to Base-form;
        Else if the last letter of Base-form is equal to /e/,
            Then set Infl-form to Base-form plus /d/;
        Else if Base-info is +[Verb Class 3],
            Then set Infl-form to Base-form with its final /y/
                replaced by /ied/;
        Else if Base-info is +[stem-final doubling],
            Then set Infl-form to Base-form plus the last
                letter of Base-form plus /ed/;
        Else set Infl-form to Base-form plus /ed/;
        If Inflections is +[infinitive],
            Then do;
                Set Ret-infl-form to Base-form;
                If Base-form is not equal to Infl-form,
                    Then add '/' plus Infl-form to the end of Ret-infl-form;
            End;
            Else set Ret-infl-form to Infl-form;
        Go to Endit;
    End;
f Vbd-form contains a '/',
    Then set Vbn-form to blank;
lse if Vbn-form contains a '/',
    Then set Vbd-form to blank;
Inflections is +[infinitive],
    Then do;
        Set Temp-infl-form to Base-form;
        If Vbd-form is not blank,
            Then if Vbd-form is not equal to Base-form,
                Then add Vbd-form preceded by '/' to Temp-infl-form;
        If Vbn-form is not blank,
            Then if Vbn-form is not equal to Vbd-form or Base-form,
                Then add Vbd-form preceded by '/' to Temp-infl-form;
        If Temp-infl-form is longer than 25 letters,
            Then do;
                Trim and mark the excess;
                Set Ret-infl-form to Temp-infl-form;
            End;
            Else set Ret-infl-form to Temp-infl-form;
    End;
lse if Vbd-form is not blank,
    Then do;
        Set Temp-infl-form to Vbd-form;
        If Vbn-form is not blank,
            Then if Vbd-form is not equal to Vbn-form,
                Then add Vbn-form preceded by '/' to Temp-infl-form;
        If Temp-infl-form is longer than 25 letters,
            Then do;
                Trim and mark the excess;
                Set Ret-infl-form to Temp-infl-form;
            End;
            Else set Ret-infl-form to Temp-infl-form;
    End;
:ndit:
f Base-form is not normally capitalized, but is in this case,
    Then capitalize the first letter of Ret-infl-form and each other
        letter in Ret-infl-form preceded by a '/' (if any);
leturn to calling procedure;
```

Having described the invention, what is claimed as new and secured by Letters Patent is:

1. An apparatus for the electronic storage of linguistic expressions, said apparatus comprising
    A. main dictionary means for storing at least one addressable entry representative of a linguistic expression, said expression being at least one of a base form of a regular paradigm, a base form of a partially irregular paradigm, an exceptional inflected form of a partially irregular paradigm, and an element of a fully irregular paradigm, and
    B. means for storing linguistic information corresponding to at least one said stored entry and comprising at least one of
        (i) a first coding means for storing a first linguistic information pattern corresponding to at least one said stored regular paradigm base form-representative entry,
        (ii) a second coding means for storing an addressable second linguistic information pattern corresponding to at least one said stored partially irregular paradigm base form-representative entry, and
        (iii) a third coding means for storing an addressable third linguistic information pattern corresponding to at least one said stored fully irregular paradigm element-representative entry.

2. An apparatus according to claim 1 in which said first coding means comprises paradigm coding means for storing any one of a signal representative of a nominal paradigm, a signal representative of a verbal paradigm, and a signal indicative of an address of a second linguistic information pattern.

3. An apparatus according to claim 2 in which said paradigm coding means comprises means for storing a signal representative of a verbal suffix pattern.

4. An apparatus according to claim 2 in which said paradigm coding means comprises means for storing a signal representative of a nominal suffix pattern.

5. An apparatus according to claim 2 in which said first coding means comprises means for storing a signal indicative of a grammatical classification being at least one of a nominal grammatical classification and a verbal grammatical classification.

6. An apparatus according to claim 1 in which said second coding means comprises means for storing a signal representative of at least one of a partial verbal paradigm and a partial nominal paradigm.

7. An apparatus according to claim 6 in which said partial paradigm storage means comprises means for storing a signal representative of at least one of a verbal third-person singular inflection and a verbal present participle inflection.

8. An apparatus according to claim 6 in which said partial inflectional paradigm storage means comprises means for storing a signal representative of a nominal suffix pattern.

9. An apparatus according to claim 6 in which said second coding means comprises means for storing a signal indicative of at least one of a verbal grammatical classification and a nominal grammatical classification.

10. An apparatus according to claim 6 in which said partial paradigm storage means comprises means for storing a signal indicative of said corresponding stored entry being at least one of a verbal past tense inflectional form and a verbal past participle inflectional form.

11. An apparatus according to claim 6 in which said second coding means comprises means for storing a signal indicative of an address of at least one said corresponding stored entry.

12. An apparatus according to claim 6 in which said second coding means comprises means for storing a signal representative of an exceptional inflectional form expression corresponding to at least one said partial paradigm-representative signal.

13. An apparatus according to claim 12 in which said exceptional inflectional expression-representative signal storing means comprises means for storing a signal indicative of at least one of a grammatical classification and an inflectional classification.

14. An apparatus according to claim 12 in which said exceptional inflectional expression-representative signal storing means comprises means for storing a signal representative of at least one of a nominal suffix pattern and a verbal suffix pattern.

15. An apparatus according to claim 12 in which said exceptional inflectional expression-representative signal storing means comprises means for storing a signal indicative of an address of at least one said corresponding partial paradigm-representative signal.

16. An apparatus according to claim 1 in which said third coding means comprises means for storing a signal representative of at least one addressable other elemental expression of a paradigm of which said corresponding stored entry is an element.

17. An apparatus according to claim 16 in which said third coding means comprises means for storing a signal indicative of at least one of a grammatical nominal classification and a grammatical verbal classification.

18. An apparatus according to claim 16 in which said third coding means comprises means for storing a signal indicative of an inflectional classification of said corresponding stored entry 19. An apparatus according to claim 16 in which said third coding means comprises means for storing a signal indicative of an address of at least one said other elemental expression which is a base form element.

20. An apparatus according to claim 1, the further improvement whereby said main dictionary means includes any one of the following dictionary sections:
    (i) a first dictionary section storing at least one addressable entry representative of a linguistic expression having a character length less than nine,
    (ii) a second dictionary section storing at least one addressable entry representative of a linguistic expression having a character length greater than or equal to nine and not more than sixteen,
    (iii) a third dictionary section storing at least one addressable entry representative of a linguistic expression having a character length greater than or equal to sixteen,
    (iv) a fourth dictionary section storing at least one addressable entry representative of a linguistic expression having a capitalized initial letter.

21. An apparatus according to claim 20 in which said at least one stored entry of at least one of said dictionary section store is bit-wise compressed.

22. An apparatus according to claim 1 in which said main dictionary further comprises means for storing a signal representative of a linguistic interrelationship between at least two said stored entries.

23. An apparatus according to claim 22 in which said interrelationship-representative signal storage means comprises means for storing a signal indicative of an addressable section of an interrelationship table, said table comprising means for storing a signal indicative of an address of at least one linguistically related stored entry.

24. An apparatus according to claim 23 in which said interrelationship-representative signal storage means comprises means for storing a signal representative of ynonymy.

25. An apparatus for processing signals representative of linguistic expressions, said apparatus comprising
  A. means for entering a signal representative of an input expression,
  B. means for determining a grammatical classification and an inflectional classification of said input expression,
  C. means for outputting a signal representative of said classification determination, and
  D. means for generating a signal representative of an expression linguistically related to said input expression, said related expression signal-generating means including inflect means for generating a signal representative of an expression of like grammatical and inflectional classification to said input expression.

26. An apparatus according to claim 25 in which said grammatical-inflection classification determining means includes means for determining a base form of said input expression.

27. An apparatus according to claim 26 in which said base form-determining means includes means for determining a suffix of said input expression.

28. An apparatus for processing signals representative of linguistic expressions, said aparatus comprising
  A. means for entering a signal representative of an input expression,
  B. means for determining a grammatical classification and an inflectional classification of said input expression,
  C. means for outputting a signal representative of said classification determination,
  D. said grammatical-inflection classification determining means comprising
    main dictionary means for storing at least one addressable entry representative of a linguistic expression, said expression being at least one of a base form of a regular paradigm, a base form of a partially irregular paradigm, an exceptional inflected form of a partially irregular paradigm, and an element of a fully irregular paradigm, and
    means for storing linguistic information corresponding to at least one said stored entry and comprising at least one of
    (i) a first coding means for storing a first linguistic information pattern corresponding to at least one said stored regular paradigm base form-representative entry,
    (ii) a second coding means for storing an addressable second linguistic information pattern corresponding to at least one said stored partially irregular paradigm base form-representative entry, and
    (iii) a third coding means for storing an addressable third linguistic information pattern corresponding to at least one said stored fully irregular paradigm element-representative entry.

29. An apparatus according to claim 28 in which said second coding means comprises means for storing a signal representative of at least one of a partial verbal paradigm and a partial nominal paradigm.

30. An apparatus according to claim 29 in which said second coding means comprises means for storing a signal representative of an exceptional inflectional form expression corresponding to at least one said partial paradigm-representative signal.

31. An apparatus according to claim 28 in which said third coding means comprises means for storing a signal representative of at least one addressable other elemental expression of a paradigm of which said corresponding stored entry is an element.

32. An apparatus according to claim 31 in which said inflect means comprises means responsive to said input expression being of nominal grammatical class and of plural, possessive inflectional class for
  (i) generating a signal representative of an expression suffix "ies'", if said related expression is of a first nominal class,
  (ii) generating a signal representative of an expression having a suffix "es'", if said related expression is of a second nominal class,
  (iii) generating a signal representative of an expression having a suffix "s'", if said related expression is of a third nominal class, and
  (iv) generating a signal indicative of a stored paradigm element-representative expression, if said related expression corresponds to a partially irregular paradigm not of any of said first, second, or third nominal classes.

33. An apparatus according to claim 31 in which said inflect means comprises means responsive to said input expression being of nominal grammatical class and a singular, possessive inflectional class for
  (i) generating a signal representative of an expression having a suffix "'s", if said related expression is of said first nominal class,
  (ii) generating a signal representative of an expression having a suffix "es'", if said related expression is of said second nominal class, and
  (iii) generating a signal representative of an expression having a suffix "'s", if said related expression is of said third nominal class.

34. An apparatus according to claim 31 in which said inflect means comprises means responsive to said input expression being of nominal grammatical class and a plural, non-possessive inflectional class for
  (i) generating a signal representative of an expression having a suffix "ies", if said related expression is of said first nominal class and of a regular paradigm,
  (ii) generating a signal representative of an expression having a suffix "es", if said related expression is of said second nominal class and of a regular paradigm,
  (iii) generating a signal representative of an expression having a suffix "s", if said related expression is of to said third nominal class and of a regular paradigm,
  (iv) generating a signal representative of a stored paradigm element-representative signal, if said related expression corresponds to a partially irregular paradigm,
  (v) generating a signal representative of an expression having a suffix "es", if said related expression is of said second nominal class and of a fully irregular paradigm, and
  (vi) generating a signal representative of an expression having a suffix "s", if said related expression is of a fully irregular paradigm and not of said second selected nominal class.

35. An apparatus according to claim 31 in which said inflect means comprises means responsive to said input expression being of verbal grammatical class and of third-person singular inflectional class for
  (i) generating a signal representative of an expression having a suffix "ies", if said related expression is of a first selected verbal class,
  (ii) generating a signal representative of an expression having a suffix "es", if said related expression is of a second selected verbal class, and (iii) generating a signal representative of an expression having a suffix "s", if said related expression is of neither said first verbal class nor said second verbal class.

36. An apparatus according to claim 31 in which said inflect means comprises means responsive to said input expression being of verbal grammatical class and of present participle inflectional class for (i) generating a signal representative of an expression having a doubled stem-final consonant and a suffix "ing", for selected related expressions, and (ii) generating a signal representative of an expression having a suffix "ing", for other said selected related expressions.

37. An apparatus according to claim 31 in which said inflect means further comprises means responsive to said input expression being of verbal grammatical class and of infinitive inflectional class for generating a signal representative of a base form of said related expression.

38. An apparatus according to claim 31 in which said inflect means comprises means responsive to said input expression being of verbal grammatical class and being of either past participle inflectional class or past tense inflectional class for (i) generating a signal representative of an expression having a suffix "ied", if said related expression is of said first verbal class and corresponds to a base form expression ending with the character "y", (ii) generating a signal representative of an expression having a doubled stem-final consonant and a suffix "ed", if said related expression corresponds to a base form expression requiring a doubled final consonant, and (iii) generating a signal representative of an expression having a suffix "ed", for other said related expressions.

39. A method for the electronic storage of linguistic expressions, said method comprising the steps of A. storing a main dictionary comprising at least one addressable entry representative of a linguistic expression, said expression being at least one of a base form of a regular paradigm, a base form of a partially irregular paradigm, an exceptional inflected form of a partially irregular paradigm, and an element of a fully irregular paradigm, and B. storing linguistic information corresponding to at least one said stored entry and comprising at least one of the steps of (i) storing a first linguistic information pattern corresponding to at least one said stored regular paradigm base form-reprepresentative entry, (ii) storing an addressable second linguistic information pattern corresponding to at least one said stored partially irregular paradigm base form-representative entry, and (iii) storing an addressable third linguistic information pattern corresponding to at least one said stored fully irregular paradigm element-representative entry.

40. A method according to claim 39 in which said first pattern storing step comprises storing any one of a signal representative of a nominal paradigm, a signal representative of a verbal paradigm, and a signal indicative of an address of a second linguistic information pattern.

41. A method according to claim 40 in which said first pattern storing step comprises storing a signal representative of a verbal suffix pattern.

42. A method according to claim 40 in which said first pattern storing step comprises storing a signal representative of a nominal suffix pattern.

43. A method according to claim 40 in which said first pattern storing step comprises storing a signal indicative of a grammatical classification being at least one of a nominal grammatical classification and a verbal grammatical classification.

44. A method according to claim 41 in which said second pattern storing step comprises storing a signal representative of at least one of a partial verbal paradigm and a partial nominal paradigm.

45. A method according to claim 44 in which said partial paradigm storing step comprises storing a signal representative of at least one of a verbal third-person singular inflection and a verbal present participle inflection.

46. A method according to claim 44 in which said partial paradigm storing step comprises storing a signal representative of a nominal suffix pattern.

47. A method according to claim 44 in which said second pattern storing step comprises storing a signal indicative of at least one of a verbal grammatical classification and a nominal grammatical classification.

48. A method according to claim 44 in which said partial paradigm storing step comprises storing a signal indicative of said corresponding stored entry being at least one of a verbal past tense inflectional form and a verbal past participle inflectional form.

49. A method according to claim 44 in which said second pattern storing step comprises storing a signal indicative of an address of at least one said corresponding stored entry.

50. A method according to claim 44 in which said second pattern storing step comprises storing a signal representative of an exceptional inflectional form expression corresponding to at least one said partial paradigm-representative signal.

51. A method according to claim 50 in which said exceptional inflectional expression-representative signal storing step comprises storing a signal indicative of at least one of a grammatical classification and an inflectional classification.

52. A method according to claim 50 in which said exceptional inflectional expression-representative signal storing step comprises storing a signal representative of at least one of a nominal suffix pattern and a verbal suffix pattern.

53. A method according to claim 50 in which said exceptional inflectional expression-representative signal storing step comprises storing a signal indicative of an address of at least one said corresponding partial paradigm-representative signal.

54. A method according to claim 39 in which said third pattern storing step comprises storing a signal representative of at least one addressable other elemental expression of a paradigm of which said corresponding stored entry is an element.

55. A method according to claim 54 in which said third pattern storing step comprises storing a signal indicative of at least one of a grammatical nominal classification and a grammatical verbal classification.

56. A method according to claim 54 in which said third pattern storing step comprises storing a signal indicative of an inflectional classification of said corresponding stored entry.

57. A method according to claim 54 in which said third pattern storing step comprises storing a signal indicative of an address of at least one said other elemental expression which is a base form element.

58. A method according to claim 39, in which said main dictionary storing step comprises at least one of (i) storing a first dictionary section comprising at least one addressable entry representative of a linguistic expression having a character length less than nine, (ii) storing a second dictionary section comprising at least one addressable entry representative of a linguistic expression having a character length greater than nine and not more than sixteen, (iii) storing a third dictionary section comprising at least one addressable entry representative of a linguistic expression having a character length greater than sixteen, (iv) storing a fourth dictionary section comprising at least one addressable entry representative of a linguistic expression having a capitalized initial letter.

59. A method according to claim 58 in which at least one said dictionary section storing step comprises storing at least one said entry in a bit-wise compressed form.

60. A method according to claim 39 in which said main dictionary storing step further comprises storing a signal representative of a linguistic interrelationship between at least two said stored entries.

61. A method according to claim 60 in which said interrelationship-representative signal storing step comprises storing a signal indicative of an addressable section of an interrelationship table, said table comprising at least one signal indicative of an address of at least one linguistically related stored entry.

62. A method according to clam 61 in which said interrelationship-representative signal storing step comprises storing a signal representative of synonymy.

63. A method for processing signals representative of linguistic expressions, comprising the steps of
A. receiving a signal representative of an input expression,
B. determining a grammatical and an inflectional classification of said input expression, and
C. outputting a signal indication of said classification-representative,
D. generating a signal representative of an expression linguistically related to said input expression,
said related expression signal-generating step including an inflecting step for generating a signal representative of an expression of like grammatical and inflectional classification to said input expression.

64. A method according to claim 63 in which said grammatical-inflection classification determining step includes determining a base form of said input expression.

65. A method according to claim 64 in which said base form-determining step includes determining a suffix of said input expression.

66. A method for processing signals representative of linguistic expressions, comprising the steps of
A. receiving a signal representative of an input expression,
B. determining a grammatical and an inflectional classification of said input expression,
C. outputting a signal indication of said classification-representative,
D. said grammatical-inflecton classification determining step comprising the steps of
storing a main dictionary comprising at least one addressable entry representative of a linguistic expression, said expression being at least one of a base form of a regular paradigm, a base form of a partially irregular paradigm, an exceptional inflected form of a partially irregular paradigm, and an element of a fully irregular paradigm, and storing linguistic information corresponding to at least one said stored entry and comprising at least one of the steps of
(i) storing a first linguistic information pattern corresponding to at least one said stored regular paradigm base form-representative entry,
(ii) storing an addressable second linguistic information pattern corresponding to at least one said stored partially irregular paradigm base form-representative entry, and
(iii) storing an addressable third linguistic information pattern corresponding to at least one said stored fully irregular paradigm element-representative entry.

67. A method according to claim 66 which said second coding step comprises storing a signal representative of at least one of a partial verbal paradigm and a partial nominal paradigm.

68. A method according to claim 67 in which said second coding step comprises storing a signal representative of an exceptional inflectional form expression corresponding to at least one said partial paradigm-representative signal.

69. A method according to claim 66 in which said third coding step comprises storing a signal representative of at least one addressable other elemental expression of a paradigm of which said corresponding stored entry is an element.

70. A method according to claim 69 in which said inflecting step comprises responding to said input expression being of nominal grammatical class and of plural, possessive inflectional class for
(i) generating a signal representative or an expression having a suffix "ies'", if said related expression is of a first nominal class,
(ii) generating a signal representative of an expression having a suffix "es'", if said related expression is of a second nominal class,
(iii) generating a signal representative of an expression having a suffix "s'", if said related expression is of a third nominal class, and
(iv) generating a signal indicative of a stored paradigm element-representative expression, if said related expression corresponds to a partially irregular paradigm not of any of said first, second, or third nominal classes.

71. A method according to claim 69 in which said inflecting step comprises responding to said input expression being of nominal grammatical class and a singular, possessive inflectional class for
(i) generating a signal representative or an expresion having a suffix "'s", if said related expression is of said first nominal class,
(ii) generating a signal representative of an expression having a suffix "es'", if said related expression is of said second nominal class, and
(iii) generating a signal representative of an expression having a suffix "'s", if said related expression is of said third nominal class.

72. A method according to claim 69 in which said inflecting step comprises responding to said input expression being of nominal grammatical class and a plural, non-possessive inflectional class for
(i) generating a signal representative of an expression having a suffix "ies", if said related expression is of said first nominal class and of a regular paradigm,
(ii) generating a signal representative of an expression having a suffix "es", if said related expression is of said second nominal class and of a regular paradigm, (iii) generating a signal representative of an expression having a suffix "s", if said related expression is of to said third nominal class and of a regular paradigm, (iv) generating a signal representative of a stored paradigm element-representative signal, if said related expression corresponds to a partially irregular paradigm, (v) generating a signal representative of an expression having a suffix "es", if said related expression is of said second nominal class and of a fully irregular paradigm, and (vi) generating a signal representative of an expression having a suffix "s", if said related expression is of a fully irregular paradigm and not of said second selected nominal class.

73. a method according to claim 69 in which said inflecting step comprises responding to said input expression being of verbal grammatical class and of third-person singular inflectional class for (i) generating a signal representative of an expression having a suffix "ies", if said related expression is of a first selected verbal class, (ii) generating a signal representative of an expression having a suffix "es", if said related expression is of a second selected verbal class, and (iii) generating a signal representative of an expression having a suffix "s", if said related expression is of neither said first verbal class nor said second verbal class.

74. A method according to claim 69 in which said inflecting step comprises responding to said input expression being of verbal grammatical class and of present participle inflectional class for (i) generating a signal representative of an expression having a doubled stem-final consonant and a suffix "ing", for selected related expressions, and (ii) generating a signal representative of an expression having a suffix "ing", for other said selected related expressions.

75. A method according to claim 69 in which said inflecting step further comprises responding to said input expression being of verbal grammatical class and of infinitive inflectional class for generating a signal representative of a base form of said related expression.

76. A method according to claim 69 in which said inflecting step comprises responding to said input expression being of verbal grammatical class and being of either past participle inflectional class or past tense inflectional class for (i) generating a signal representative of an expression having a suffix "ied", if said related expression is of said first verbal class and corresponds to a base form expression ending with the character "y", (ii) generating a signal representative of an expression having a doubled stem-final consonant and a suffix "ed", if said related expression corresponds to a base form expression requiring a doubled final consonant, and (iii) generating a signal representative of an expression having a suffix "ed", for other said related expressions.

* * * * *

UNITED STATES PATENT AND TRADEMARK OFFICE
CERTIFICATE OF CORRECTION

PATENT NO. : 4,724,523

DATED : February 9, 1988

INVENTOR(S) : Henry Kucera

Page 1 of 3

It is certified that error appears in the above-identified patent and that said Letters Patent is hereby corrected as shown below:

Column 2, line 47, replace "'transfer, transfer<u>s</u>, transfer<u>red</u>, transferred, transferring'" with -- "transfer, transfer<u>s</u>, transfer<u>red</u>, transfer<u>red</u>, transfer<u>ring</u>".

Column 2, line 54, replace "dogs." with -- dog<u>s</u>. --.

Column 2, line 62, replace "'dog, dog's, dogs nominal" with -- "dog, dog's, dogs, dogs'". Similarly the nominal --.

Column 12, line 13, replace "inter alia" with -- <u>inter alia</u> --.

Column 12, line 16, replace "inter alia" with -- <u>inter alia</u> --.

Column 12, line 42, replace "inter alia" with -- <u>inter alia</u> --.

Column 14, line 9, replace "rnflectional" with -- inflectional --.

Column 18, line 12, replace "stastis" with -- stasis --.

UNITED STATES PATENT AND TRADEMARK OFFICE
CERTIFICATE OF CORRECTION

PATENT NO. : 4,724,523
DATED : February 9, 1988
INVENTOR(S) : Henry Kucera

It is certified that error appears in the above-identified patent and that said Letters Patent is hereby corrected as shown below:

Column 28, line 2, after "'Base form'" insert -- . --.

Column 38, line 34, after "entry" insert -- . --.

Column 39, line 26, replace "aparatus" with -- apparatus --.

Column 40, line 8, before "suffix" insert -- having a --.

Column 43, line 26, replace "clam" with -- claim --.

Column 43, line 60, replace "grammatical-inflecton" with -- grammatical-inflection --.

Column 44, line 33, replace "or" with -- of --.

Column 44, line 51, replace "or an expresion" with -- of an expression --.

Column 45, line 19, replace "a" with -- A --.

UNITED STATES PATENT AND TRADEMARK OFFICE
CERTIFICATE OF CORRECTION

PATENT NO. : 4,724,523
DATED : February 9, 1988
INVENTOR(S) : Henry Kucera

It is certified that error appears in the above-identified patent and that said Letters Patent is hereby corrected as shown below:

Column 5, line 54, replace "dictionaries" with -- dictionary --.

Column 6, line 8, replace "grammer" with -- grammar --.

Column 8, line 1, replace "require" with -- requires --.

Column 12, line 37, replace "similary" with -- similarly --.

Column 40, line 49, replace "of to said" with -- of said --.

Signed and Sealed this

Fourteenth Day of February, 1989

Attest:

DONALD J. QUIGG

*Attesting Officer*     *Commissioner of Patents and Trademarks*